United States Patent
Tamatani et al.

(10) Patent No.: US 12,213,394 B2
(45) Date of Patent: Feb. 4, 2025

(54) AGRICULTURAL SUPPORT SYSTEM INCLUDING TRANSPORT VEHICLE CAPABLE OF TRANSPORTING AGRICULTURAL MACHINE

(71) Applicant: KUBOTA CORPORATION, Osaka (JP)

(72) Inventors: Kenji Tamatani, Sakai (JP); Yuji Okuyama, Sakai (JP); Kazuo Sakaguchi, Sakai (JP); Yusuke Takahashi, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 263 days.

(21) Appl. No.: 17/839,534

(22) Filed: Jun. 14, 2022

(65) Prior Publication Data

US 2022/0400597 A1    Dec. 22, 2022

(30) Foreign Application Priority Data

Jun. 21, 2021 (JP) ................. 2021-102522

(51) Int. Cl.
| | |
|---|---|
| *A01B 69/00* | (2006.01) |
| *A01B 69/04* | (2006.01) |
| *B60P 3/06* | (2006.01) |
| *G05D 1/00* | (2006.01) |
| *H04W 4/46* | (2018.01) |

(52) U.S. Cl.
CPC .......... *A01B 69/008* (2013.01); *B60P 3/064* (2013.01); *G05D 1/0274* (2013.01); *H04W 4/46* (2018.02)

(58) Field of Classification Search
CPC ........ A01B 69/008; B60P 3/064; H04W 4/46; H04W 4/02
USPC .......................................... 701/50
See application file for complete search history.

(56) References Cited

U.S. PATENT DOCUMENTS

| | | | |
|---|---|---|---|
| 7,224,365 B1* | 5/2007 | Seideman | G06T 11/206 715/764 |
| 10,488,860 B1* | 11/2019 | Koch | G06F 16/9537 |
| 11,691,727 B1* | 7/2023 | Brown | B64U 70/93 701/2 |
| 11,873,100 B2* | 1/2024 | Wake | B64C 39/024 |
| 2013/0004014 A1* | 1/2013 | Hickman | G06F 16/687 707/736 |
| 2017/0323257 A1* | 11/2017 | Cheatham, III | G06Q 10/0832 |

FOREIGN PATENT DOCUMENTS

| | | |
|---|---|---|
| JP | 2020-106977 A | 7/2020 |
| JP | 2021-037775 A | 3/2021 |

* cited by examiner

*Primary Examiner* — Andrew R Dyer
(74) *Attorney, Agent, or Firm* — Keating & Bennett, LLP

(57) ABSTRACT

An agricultural support system includes a first communication device located in or on a tractor to transmit information, and a second communication device located in or on a transport vehicle to acquire the information transmitted from the first communication device. The transport vehicle is capable of transporting the tractor. The agricultural support system further includes a position sensor in or on the working machine to detect a position of the working machine. The first communication device is operable to transmit the position detected by the position sensor to the second communication device as the information. The second communication device is operable to receive the position transmitted from the first communication device.

8 Claims, 33 Drawing Sheets

Fig.3
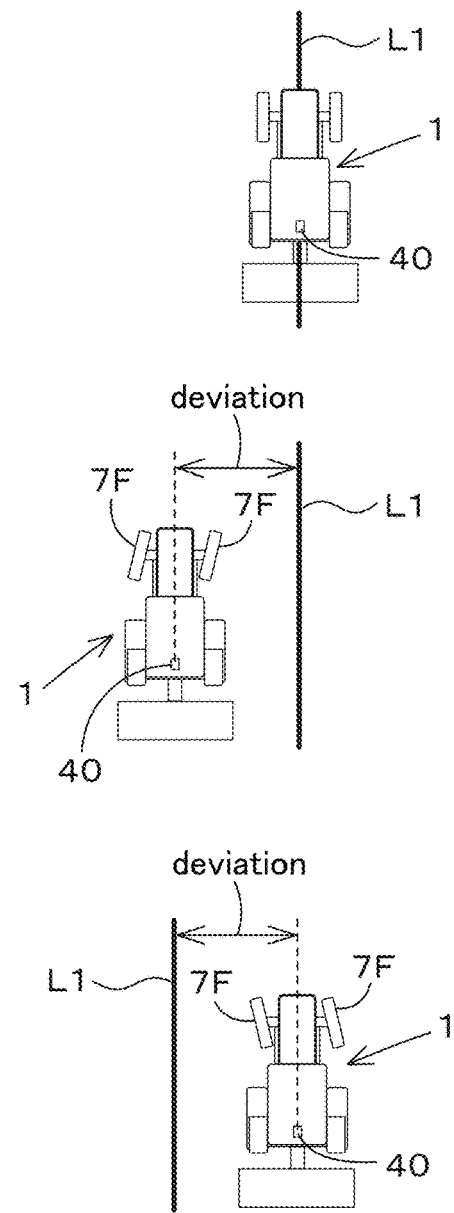
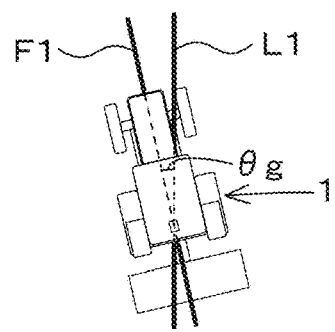

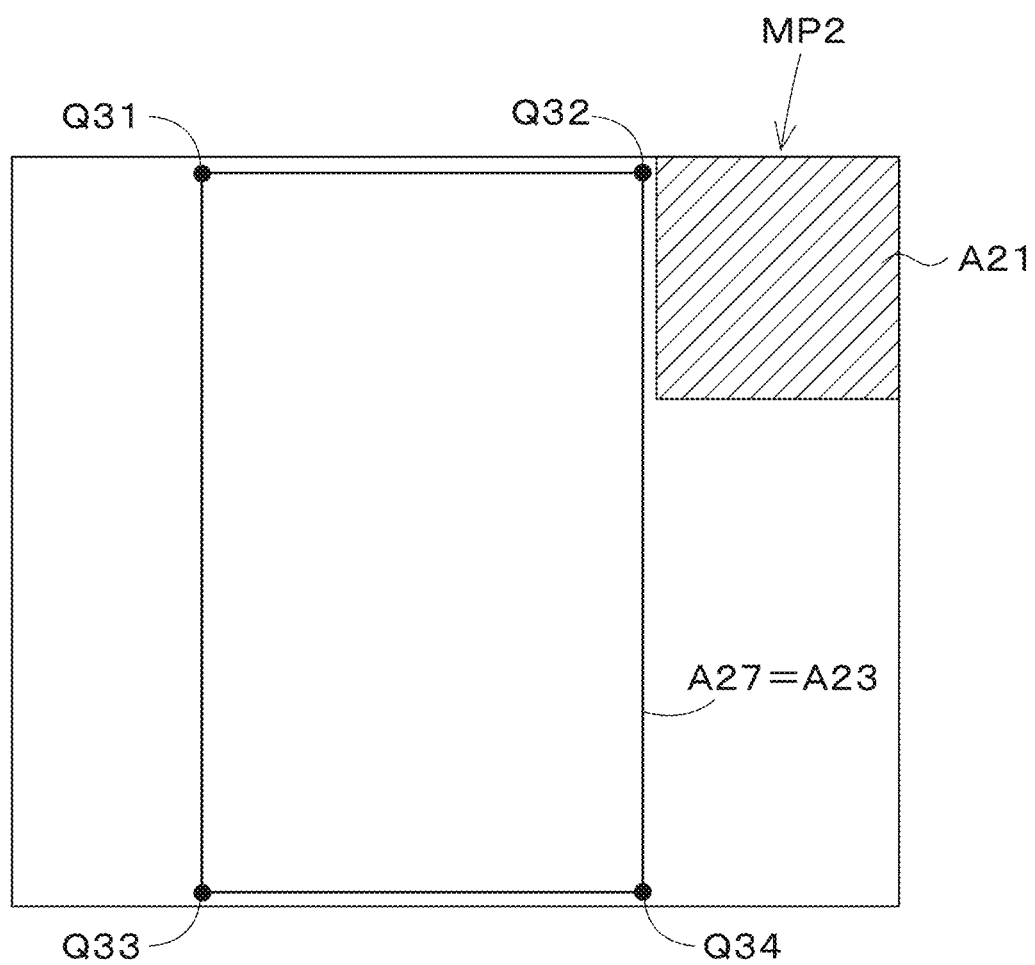

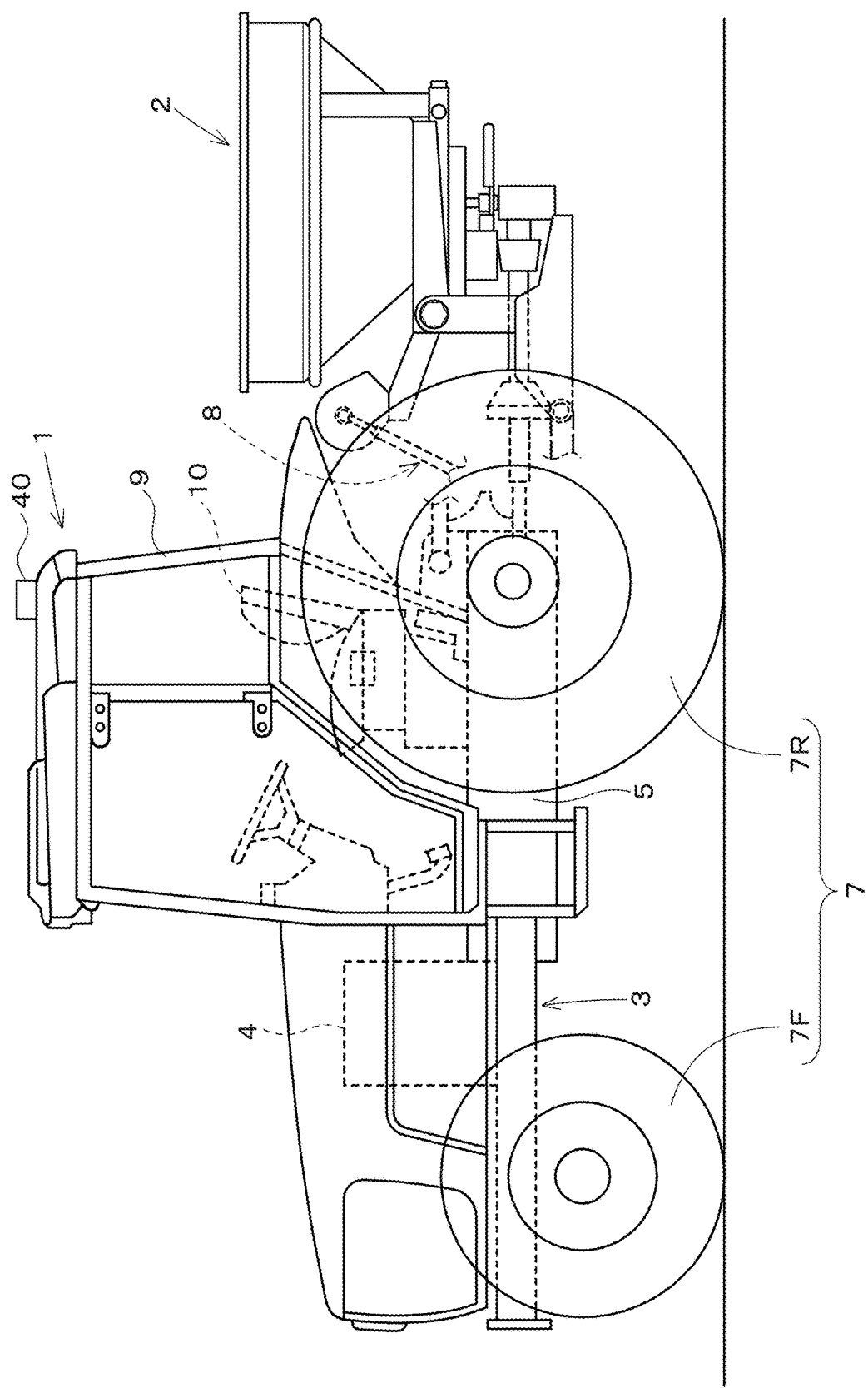

AGRICULTURAL SUPPORT SYSTEM INCLUDING TRANSPORT VEHICLE CAPABLE OF TRANSPORTING AGRICULTURAL MACHINE

CROSS REFERENCE TO RELATED APPLICATIONS

This application claims the benefit of priority to Japanese Patent Application No. 2021-102522 filed on Jun. 21, 2021. The entire contents of this application are hereby incorporated herein by reference.

BACKGROUND OF THE INVENTION

1. Field of the Invention

The present invention relates to an agricultural support system including a transport vehicle capable of transporting a working machine such as an agricultural machine or a construction machine.

2. Description of the Related Art

In the related art, a technique disclosed in Japanese Unexamined Patent Application Publication No. 2020-106977 is known as a technique for creating a planned travel route along which an agricultural machine such as a tractor is caused to automatically travel in an agricultural field. The agricultural machine described in Japanese Unexamined Patent Application Publication No. 2020-106977 includes a map registration unit that registers an agricultural field in a map, and a travel route generation unit that creates a travel route in the agricultural field registered in the map.

SUMMARY OF THE INVENTION

The agricultural machine disclosed in Japanese Unexamined Patent Application Publication No. 2020-106977 enables registration of an agricultural field in a map and creation of a travel route in the agricultural field, and is capable of automatically traveling along the travel route in the agricultural field. However, a transport vehicle capable of transporting the agricultural machine does not have the same map as the map stored in the agricultural machine (for example, a map including the agricultural field and the travel route in the agricultural field). The transport vehicle that does not have such a map is not supportable for traveling in the agricultural field. More specifically, the transport vehicle typically includes a car navigation device, and the car navigation device uses a map obtained from a map provider company or the like. However, the map used by the car navigation device does not necessarily include map information such as the agricultural field and a farm road leading to the agricultural field. In this case, it is difficult for the transport vehicle to receive support for traveling in the agricultural field by using the car navigation device. Since the transport vehicle is incapable of receiving information from the agricultural machine, it is actually difficult for the transport vehicle to use the information from the agricultural machine for agricultural support.

Preferred embodiments of the present invention provide agricultural support systems that each allow a transport vehicle capable of transporting a working machine to use information from the working machine for agricultural support.

Preferred embodiments of the present invention will be described in the following.

An agricultural support system according to a preferred embodiment of the present invention includes a first communication device in or on a working machine to transmit information, and a second communication device in or on a transport vehicle to acquire the information transmitted from the first communication device. The transport vehicle is operable to transport the working machine.

The agricultural support system may further include a position sensor in or on the working machine to detect a position of the working machine. The first communication device may transmit the position detected by the position sensor to the second communication device as the information. The second communication device may receive the position transmitted from the first communication device.

The agricultural support system may further include a route creator in or on the working machine to create a travel route of the working machine. The first communication device may transmit the travel route created by the route creator to the second communication device as the information. The second communication device may receive the travel route transmitted from the first communication device.

Alternatively, the route creator may create the travel route that has not been set for the transport vehicle.

The agricultural support system may further include a first storage in or on the working machine to store a first map. The first communication device may transmit the first map stored in the first storage to the second communication device as the information. The second communication device may receive the first map transmitted from the first communication device.

The agricultural support system may further include a second storage in or on the transport vehicle to store a second map, and a display in or on the transport vehicle to display the second map. The second communication device may output the first map transmitted from the first communication device to the display. The display may display the first map on top of the second map.

The first storage may store the first map, which includes road information not included in the second map.

The agricultural support system may further include an instructor to instruct the working machine to transmit the information from the first communication device to the second communication device.

The instructor may include a switch in or on the transport vehicle.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

FIG. 3 includes views describing automatic travel.

FIG. 8C is a diagram illustrating an example of setting of a third area.

FIG. 10 is a diagram illustrating an example of setting a travel route in the third area and the like.

FIG. 20 is a side view of the tractor.

DETAILED DESCRIPTION OF THE PREFERRED EMBODIMENTS

Figure 1:
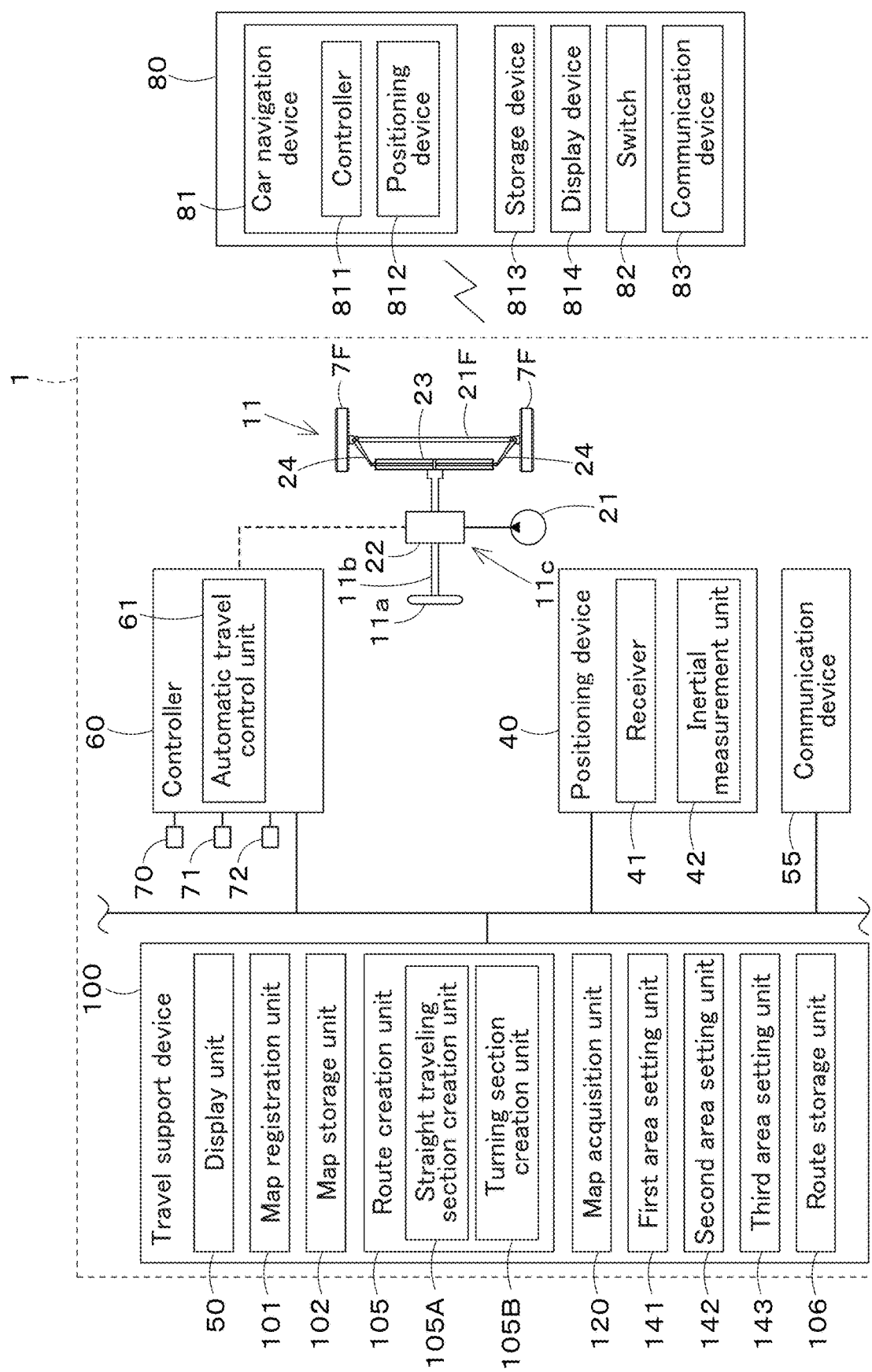
FIG. 1 is a block diagram of an agricultural support system according to a first preferred embodiment of the present invention.

The preferred embodiments will now be described with reference to the accompanying drawings, wherein like reference numerals designate corresponding or identical elements throughout the various drawings. The drawings are to be viewed in an orientation in which the reference numerals are viewed correctly.

Preferred embodiments of the present invention will be described hereinafter with reference to the drawings.

First Preferred Embodiment

FIG. 1 is a block diagram of an agricultural support system according to a first preferred embodiment. The agricultural support system is a system that includes an agricultural machine (for example, a tractor 1) and a transport vehicle 80 and that enables the transport vehicle 80 to use information from the agricultural machine for agricultural support. The agricultural machine is an example of an automatically operable working machine. The transport vehicle 80 is capable of transporting the agricultural machine. Configurations of the tractor 1 and the transport vehicle 80 will be described in order.

First, the tractor 1 (working vehicle), which is an example of an agricultural machine, will be described.

As illustrated in FIG. 20, the tractor 1 includes a traveling vehicle 3, a prime mover 4, and a transmission 5. The traveling vehicle 3 includes a traveling device 7. The traveling device 7 is a device including at least one front wheel 7F and at least one rear wheel 7R. The front wheel 7F may be of a tire type or a crawler type. The rear wheel 7R may also be of a tire type or a crawler type. The prime mover 4 is a diesel engine, an electric motor, or the like. The transmission 5 is capable of switching a propelling force of the traveling device 7 by shifting gears and is also capable of switching the traveling device 7 between forward travel and reverse travel. The traveling vehicle 3 includes a cabin 9, and the cabin 9 includes an operator's seat 10.

The traveling vehicle 3 further includes a lifting device 8 at a rear portion thereof, and the lifting device 8 includes a three-point linkage, for example. A working device 2 is detachably attached to the lifting device 8. Coupling the working device 2 to the lifting device 8 allows the traveling vehicle 3 to tow the working device 2. Examples of the working device 2 include a cultivator for cultivation, a fertilizer spreader for spreading fertilizer, an agricultural chemical spreader for spreading an agricultural chemical, a harvester for harvesting crops, a mower for cutting grass and the like, a tedder for spreading out grass and the like, a rake for collecting grass and the like, and a baler for baling grass and the like. FIG. 20 illustrates an example in which a spreader is attached to the lifting device 8 as the working device 2.

As illustrated in FIG. 1, the tractor 1 includes a steering device 11. The steering device 11 includes a steering wheel 11a, a rotation shaft (steering shaft) 11b that rotates with rotation of the steering wheel 11a, and an assist mechanism (power steering mechanism) 11c that assists steering of the steering wheel 11a. The assist mechanism 11c includes a hydraulic pump 21, a control valve 22 to which hydraulic fluid output from the hydraulic pump 21 is supplied, and a steering cylinder 23 that is activated by the control valve 22. The control valve 22 is a solenoid valve that is activated in response to a control signal. The control valve 22 is, for example, a three-position switching valve that is switchable in response to movement of a spool or the like. The control valve 22 is also switchable in response to steering of the steering shaft 11b. The steering cylinder 23 is connected to arms (knuckle arms) 24, which serve to change the direction of the front wheel 7F.

Accordingly, when the steering wheel 11a is operated, the switching position and the opening of the control valve 22 are switched in accordance with the steering wheel 11a, and the steering cylinder 23 extends or contracts to the left or right in accordance with the switching position and opening of the control valve 22. As a result, the steering direction of the front wheel 7F can be changed. The steering device 11 described above is an example, and the configuration thereof is not limited to the one described above.

Figure 2:
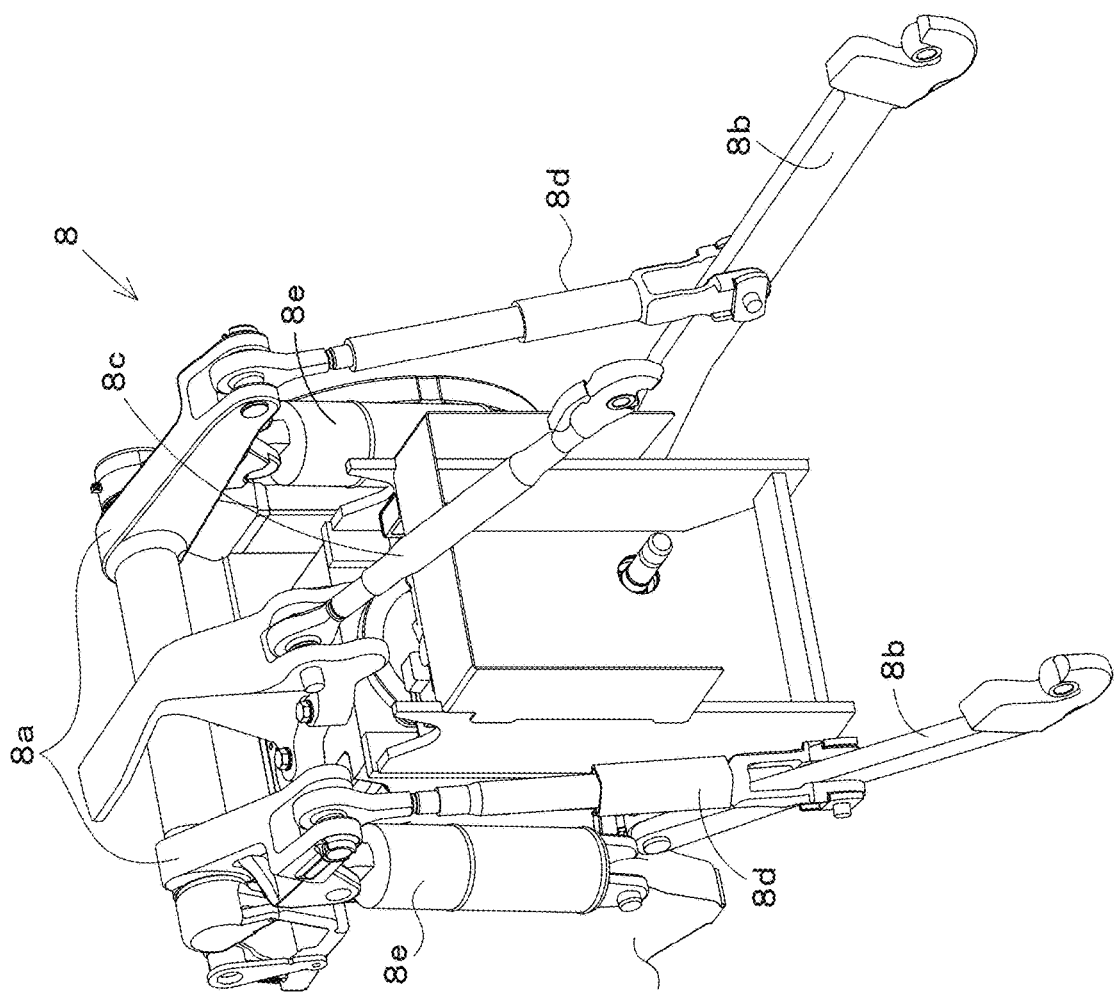
FIG. 2 is a diagram illustrating a lifting device.

As illustrated in FIG. 2, the lifting device 8 includes lift arms 8a, lower links 8b, a top link 8c, lift rods 8d, and lift cylinders 8e. Front end portions of the lift arms 8a are supported so as to be swingable upward or downward at a rear upper portion of a case (transmission case) that accommodates the transmission 5. The lift arms 8a are swung (raised and lowered) upon driving of the lift cylinders 8e. Each of the lift cylinders 8e includes a hydraulic cylinder. The lift cylinders 8e are connected to a hydraulic pump through a control valve. The control valve is a solenoid valve or the like and causes the lift cylinders 8e to extend or contract.

Front end portions of the lower links 8b are supported at a rear lower portion of the transmission 5 so as to be swingable upward or downward. A front end portion of the top link 8c is supported at a rear portion of the transmission 5 above the lower links 8b so as to be swingable upward or downward. The lift rods 8d couple the lift arms 8a to the lower links 8b. The working device 2 is coupled to rear portions of the lower links 8b and a rear portion of the top link 8c. When the lift cylinders 8e are driven (to extend or contract), the lift arms 8a are raised or lowered, and the lower links 8b, which are coupled to the lift arms 8a through the lift rods 8d, are raised or lowered. As a result, the working device 2 is swung upward or downward (raised or lowered) with front portions of the lower links 8b acting as fulcrums.

The tractor 1 includes a positioning device 40. The positioning device 40 is capable of detecting the position thereof (measured position information including latitude and longitude) by using a satellite positioning system (positioning satellites) such as Differential Global Positioning System (D-GPS), GPS, Global Navigation Satellite System (GLONASS), BeiDou, Galileo, or Michibiki. That is, the positioning device 40 receives satellite signals (positions of the positioning satellites, transmission times, correction information, etc.) transmitted from the positioning satellites, and detects the position (for example, latitude and longitude) of the tractor 1, namely, a vehicle-body position, based on the satellite signals. The positioning device 40 includes a receiver 41 and an inertial measurement unit (IMU) 42. The receiver 41 is a device including an antenna and the like and configured to receive satellite signals transmitted from the positioning satellites. The receiver 41 is mounted on the traveling vehicle 3 separately from the inertial measurement unit 42. In the first preferred embodiment, the receiver 41 is mounted on the traveling vehicle 3, that is, on the cabin 9. The location on which the receiver 41 is mounted is not limited to that in the first preferred embodiment.

The inertial measurement unit 42 includes an acceleration sensor that detects an acceleration, and a gyroscope sensor that detects an angular speed, for example. The inertial measurement unit 42 is disposed in the traveling vehicle 3, for example, below the operator's seat 10, and is capable of detecting a roll angle, a pitch angle, a yaw angle, and the like of the traveling vehicle 3.

As illustrated in FIG. 1, the tractor 1 includes a controller 60. The controller 60 is a device that controls a traveling system, a working system, and the like in the tractor 1, and includes a central processing unit (CPU) and electric and electronic circuits, for example.

The controller 60 includes an automatic travel control unit 61 that controls automatic travel of the tractor 1. The automatic travel control unit 61 is implemented by the electric and electronic circuits of the controller 60 and a program stored in the CPU or the like, for example. Upon start of automatic travel, the automatic travel control unit 61 controls the control valve 22 of the steering device 11 such that the traveling vehicle 3 travels along a travel route L1 (planned travel route) in an agricultural field or a road travel route L2 (planned road travel route) between agricultural fields described below. Upon start of automatic travel, furthermore, the automatic travel control unit 61 automatically changes the gear position of the transmission 5, the rotational speed of the prime mover 4, and the like to control the vehicle speed (or velocity) of the tractor 1. That is, the automatic travel control unit 61 is capable of performing control of straight-line automatic operation. In the control of straight-line automatic operation, for example, the steering device 11, the transmission 5, and the prime mover 4 are controlled such that the tractor 1 (the traveling vehicle 3) moves along the travel route L1 or the road travel route L2, which is set in advance.

As illustrated in FIG. 3, during automatic travel of the tractor 1, when the deviation of the vehicle-body position from the travel route L1 is less than a threshold value, the automatic travel control unit 61 maintains the rotation angle of the steering shaft (rotation shaft) 11b. When the deviation of the vehicle-body position from the travel route L1 is greater than or equal to the threshold value and the tractor 1 is to the left of the travel route L1, the automatic travel control unit 61 causes the steering shaft 11b to rotate so that the tractor 1 is steered to the right. When the deviation of the vehicle-body position from the travel route L1 is greater than or equal to the threshold value and the tractor 1 is to the right of the travel route L1, the automatic travel control unit 61 causes the steering shaft 11b to rotate so that the tractor 1 is steered to the left. In the first preferred embodiment described above, the steering angle of the steering device 11 is changed based on the deviation of the vehicle-body position from the travel route L1. However, if an azimuth (vehicle body azimuth) F1 of the traveling direction of the tractor 1 (the traveling vehicle 3) is different from the azimuth of the travel route L1, that is, if the angle θg of the vehicle body azimuth F1 relative to the travel route L1 is greater than or equal to a threshold value, the automatic travel control unit 61 may set the steering angle so that the angle θg becomes zero (the vehicle body azimuth F1 matches the azimuth of the travel route L1). Further, the automatic travel control unit 61 may set the final steering angle in automatic steering in accordance with a steering angle determined based on the deviation (position deviation) and a steering angle determined based on the azimuth (azimuth deviation). The setting of the steering angle in automatic steering according to the first preferred embodiment described above is an example, and is not limited to this example. Also in the case of the road travel route L2 illustrated in FIG. 11A to be described below, as in the case of the travel route L1 illustrated in FIG. 3, the tractor 1 is able to automatically travel along the road travel route L2.

As described above, the controller 60 enables the tractor 1 (the traveling vehicle 3) to automatically travel.

Further, the controller 60 is capable of manual raising and lowering control, automatic raising control, and the like. In the manual raising and lowering control, the lifting device 8 is controlled to raise or lower the working device 2 in response to an operation of a raising/lowering switch 72 connected to the controller 60. Specifically, the raising/lowering switch 72 is a three-position selector switch disposed around the operator's seat 10. When the raising/lowering switch 72 is switched from a neutral position to one side, a raising signal is input to the controller 60 to raise the lifting device 8 (the lift arms 8a). When the raising/lowering switch 72 is switched from the neutral position to the other side, a lowering signal is input to the controller 60 to lower the lifting device 8 (the lift arms 8a). In response to acquiring the raising signal, the controller 60 outputs a control signal to the control valve to raise the lifting device 8. In response to acquiring the lowering signal, the controller 60 outputs a control signal to the control valve to lower the lifting device 8. That is, the controller 60 is capable of manual raising and lowering control for raising or lowering the lifting device 8 in accordance with a manual operation of the raising/lowering switch 72.

In the automatic raising control, when the steering angle of the steering device 11 is greater than or equal to a predetermined value, for example, when the steering angle of the steering device 11 is a steering angle representing turning, the lifting device 8 is automatically activated to raise the working device 2. Specifically, a steering angle detector 70 and a selector switch 71 are connected to the controller 60. The steering angle detector 70 is a device that detects the steering angle of the steering device 11. The selector switch 71 is a switch for switching between enabling and disabling of the automatic raising control. The selector switch 71 is a switch that is switchable between on and off states. The automatic raising control is set enabled when the selector switch 71 is in the on state, and is set disabled when the selector switch 71 is in the off state.

When the automatic raising control is enabled and the steering angle detected by the steering angle detector 70 is greater than or equal to the steering angle representing turning, the controller 60 outputs a control signal to the control valve to perform automatic raising control for automatically raising the lifting device 8.

As described above, the controller 60 can perform control related to the tractor 1, for example, manual raising and lowering control and automatic raising control.

The tractor 1 includes a travel support device 100. The travel support device 100 is a device that supports travel of a working vehicle such as a tractor. In the first preferred embodiment, examples of the travel support device 100 include portable terminals (or mobile terminals) such as a tablet, a smartphone, and a personal digital assistant (PDA), and fixed-type terminals (or fixed terminals) such as fixed computers, for example, a personal computer and a server. The travel support device 100 may be either a device attachable to or detachable from the tractor 1 or a device fixed to the tractor 1. In one example, the travel support device 100 is a tablet (or a mobile terminal) installed near the operator's seat 10.

The travel support device 100 includes a display unit 50. The display unit 50 includes a liquid crystal panel, a touch panel, or any other panel. The travel support device 100 is capable of displaying, on the display unit 50, various kinds of information related to the tractor 1 and the working device 2 in addition to information for supporting travel of the tractor 1.

The travel support device 100 includes a map registration unit 101 and a map storage unit 102. The map registration unit 101 is implemented by electric and electronic components disposed in the travel support device 100 and a program incorporated in the travel support device 100, for example. The map storage unit 102 is implemented by a non-volatile memory or the like. The map registration unit 101 registers an outline of a predetermined agricultural field, for example, a position corresponding to the outline of the predetermined agricultural field.

Figure 4:
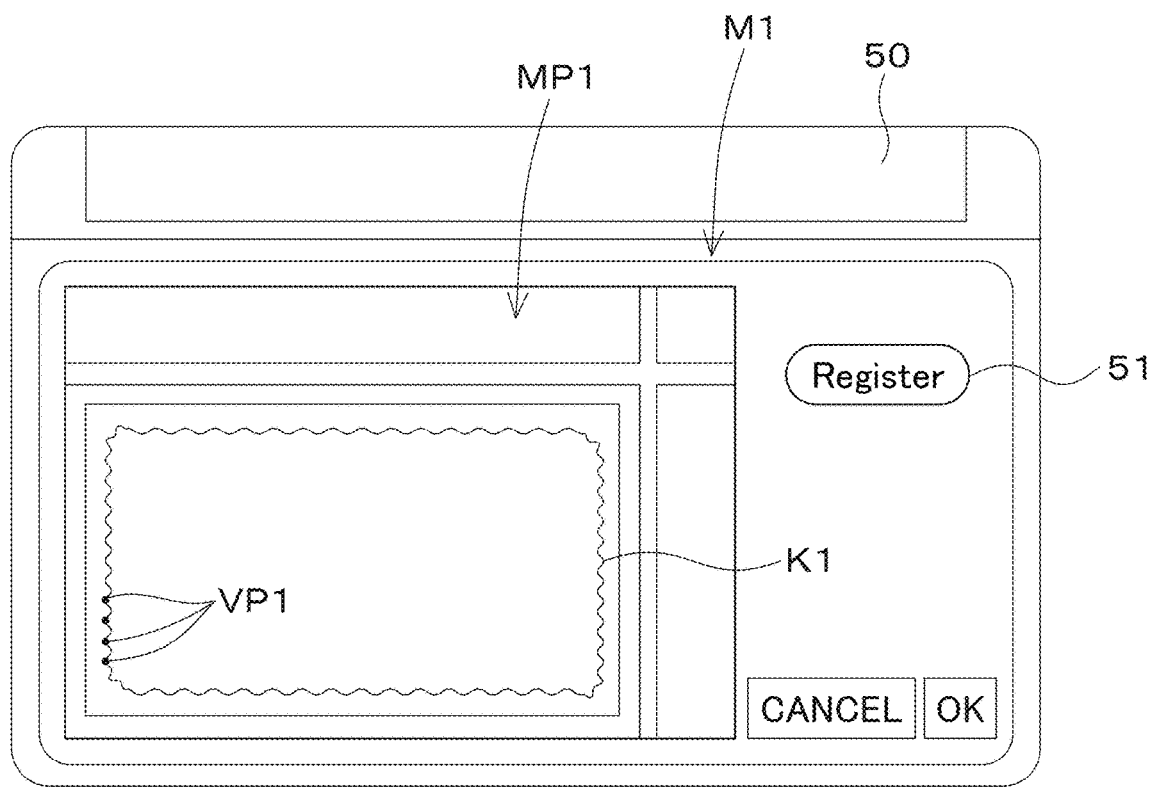
FIG. 4 is a diagram illustrating an example of a map registration screen.
Figure 5A:
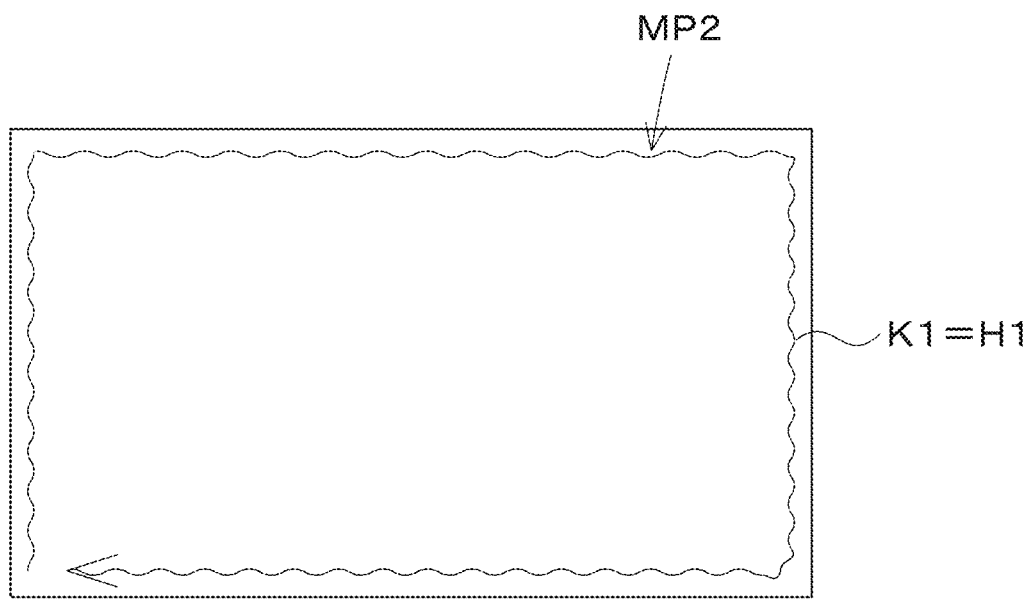
FIG. 5A is a diagram illustrating how an outline of an agricultural field (agricultural field map) is determined from a travel trajectory.

As illustrated in FIG. 4, when a worker (or an operator) performs a predetermined operation on the display unit 50, the map registration unit 101 displays a map registration screen M1 on the display unit 50. The map registration screen M1 displays a map MP1 including an agricultural field, a vehicle-body position VP1 of the tractor 1, and agricultural field identification information such as the name of the agricultural field and the management number of the agricultural field. The map MP1 is associated with image data indicating the agricultural field, as well as position information such as the latitude and longitude of the agricultural field. When the tractor 1 enters the agricultural field and moves around in the agricultural field, the map registration screen M1 displays a current vehicle-body position VP1 each time it is detected by the positioning device 40 during the movement of the tractor 1. When the movement of the tractor 1 in the agricultural field is completed and a registration button 51 displayed on the map registration screen M1 is selected, as illustrated in FIG. 5A, the map registration unit 101 registers, together with the agricultural field identification information, an agricultural field map MP2 represented by an outline (outer edge) H1 of the agricultural field, the outline H1 being a travel trajectory K1 obtained by movement of the vehicle-body position while the tractor 1 moves around in the agricultural field.

Figure 5B:
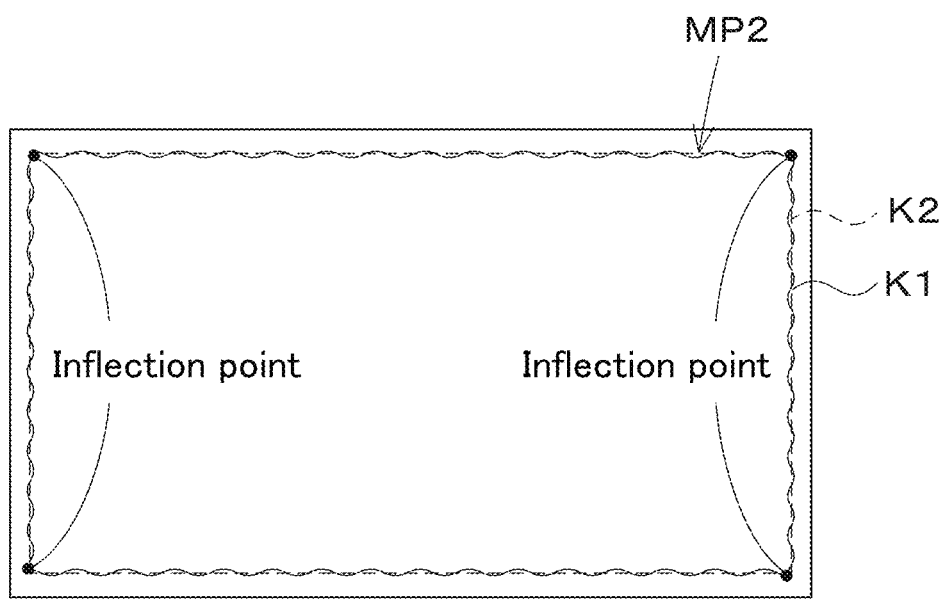
FIG. 5B is a diagram illustrating how the outline of the agricultural field (agricultural field map) is determined from inflection points of the travel trajectory.
Figure 5C:
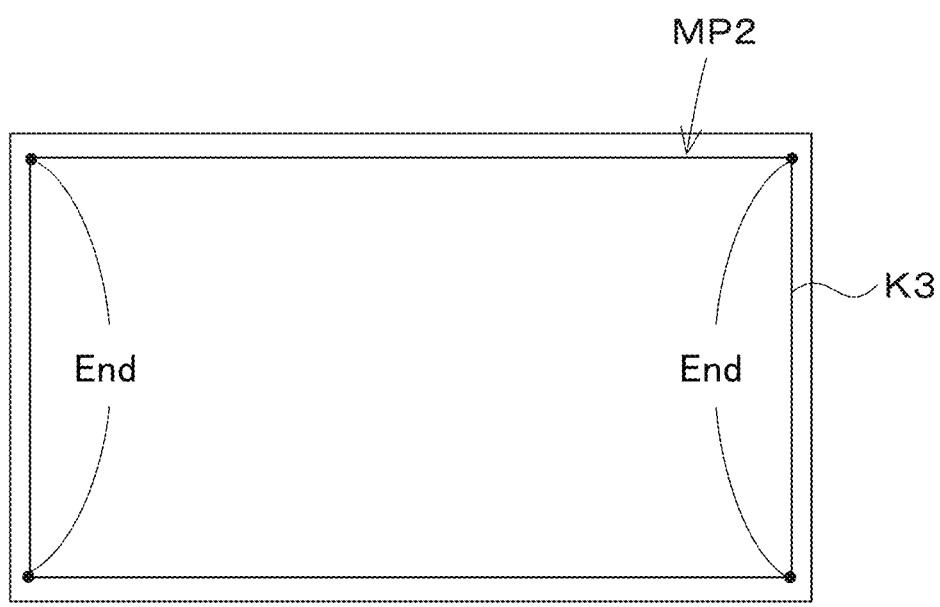
FIG. 5C is a diagram illustrating how the outline (agricultural field map) is determined in response to a switch operation during traveling.

As illustrated in FIG. 5B, the map registration unit 101 may calculate inflection points from the travel trajectory K1 indicated as a movement trace of the vehicle-body position VP1 and register an outline K2 connecting the inflection points as the outline H1 of the agricultural field (the agricultural field map MP2). Alternatively, as illustrated in FIG. 5C, the operator or the like may designate ends of the agricultural field using a switch or the like disposed in the tractor 1 when the tractor 1 moves around in the agricultural field, and an outline K3 connecting the designated ends may be registered as the outline H1 (the agricultural field map MP2). The methods of registering the agricultural field described above are examples, and the present invention is not limited to such methods. The outline of the agricultural field, that is, the agricultural field map MP2, may be data indicated by a position (latitude and longitude), data indicated by a coordinate (X-axis and Y-axis coordinates) system, or data indicated by any other expression.

The map storage unit 102 stores the agricultural field map MP2 indicating the outline (outer edge) registered by the map registration unit 101. That is, the map storage unit 102 stores the agricultural field map MP2 and data indicating the outline of the agricultural field (data for representing the predetermined agricultural field).

As described above, in the travel support device 100, the map registration unit 101 can register a plurality of agricultural field maps MP2. Before start of work or the like, an agricultural field map MP2 indicating a predetermined agricultural field is acquired from among the plurality of agricultural field maps MP2. Specifically, the travel support device 100 includes a map acquisition unit 120. The map acquisition unit 120 is implemented by electric and electronic components disposed in the travel support device 100 and a program incorporated in the travel support device 100, for example.

Figure 6:
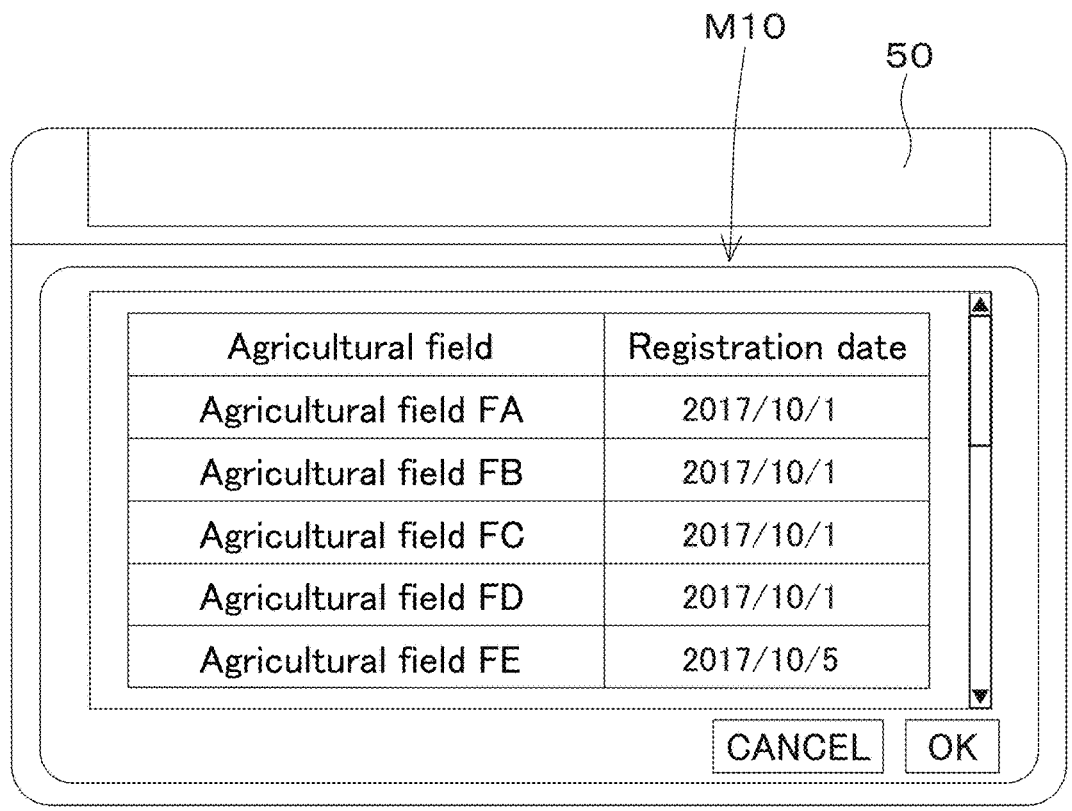
FIG. 6 is a diagram illustrating an example of a map selection screen.

When the worker (operator) performs a predetermined operation on the display unit 50, as illustrated in FIG. 6, the map acquisition unit 120 displays a map selection screen M10 on the display unit 50. The map selection screen M10 displays a list of agricultural fields stored in the map storage unit 102, that is, a list of pieces of agricultural field identification information of the agricultural fields. When the operator performs a predetermined operation on the display unit 50, for example, one of the plurality of pieces of agricultural field identification information displayed on the map selection screen M10 can be selected. When agricultural field identification information is selected, the map acquisition unit 120 refers to the map storage unit 102 and acquires an agricultural field map MP2 corresponding to the selected agricultural field identification information, that is, a predetermined agricultural field map MP2.

Settings related to traveling and working can be made on the agricultural field map MP2 acquired by the map acquisition unit 120, that is, the predetermined agricultural field.

The travel support device 100 includes a first area setting unit 141, a second area setting unit 142, and a third area setting unit 143. The first area setting unit 141, the second area setting unit 142, and the third area setting unit 143 are each implemented by electric and electronic components disposed in the travel support device 100 and a program incorporated in the travel support device 100, for example.

The first area setting unit 141 sets, in the agricultural field map MP2 (predetermined agricultural field), a first area A21 in which neither traveling of the traveling vehicle 3 nor working with the working device 2 can be performed. That is, the first area setting unit 141 sets, in the agricultural field map MP2 (predetermined agricultural field), the first area A21 in which traveling and working are prohibited.

The second area setting unit 142 sets, in the agricultural field map MP2 (predetermined agricultural field), a second area A22 in which traveling of the traveling vehicle 3 can be performed but working with the working device 2 cannot be performed. That is, the second area setting unit 142 sets, in the agricultural field map MP2 (predetermined agricultural field), the second area A22 in which traveling is permitted, but working is prohibited.

The third area setting unit 143 sets, in the agricultural field map MP2 (predetermined agricultural field), a third area A23 in which traveling of the traveling vehicle 3 and working with the working device 2 can be performed. That is, the third area setting unit 143 sets, in the agricultural field map MP2 (predetermined agricultural field), the third area A23 in which both traveling and working are permitted.

The setting of the first area A21, the second area A22, and the third area A23 will be described in detail hereinafter.

Figure 7:
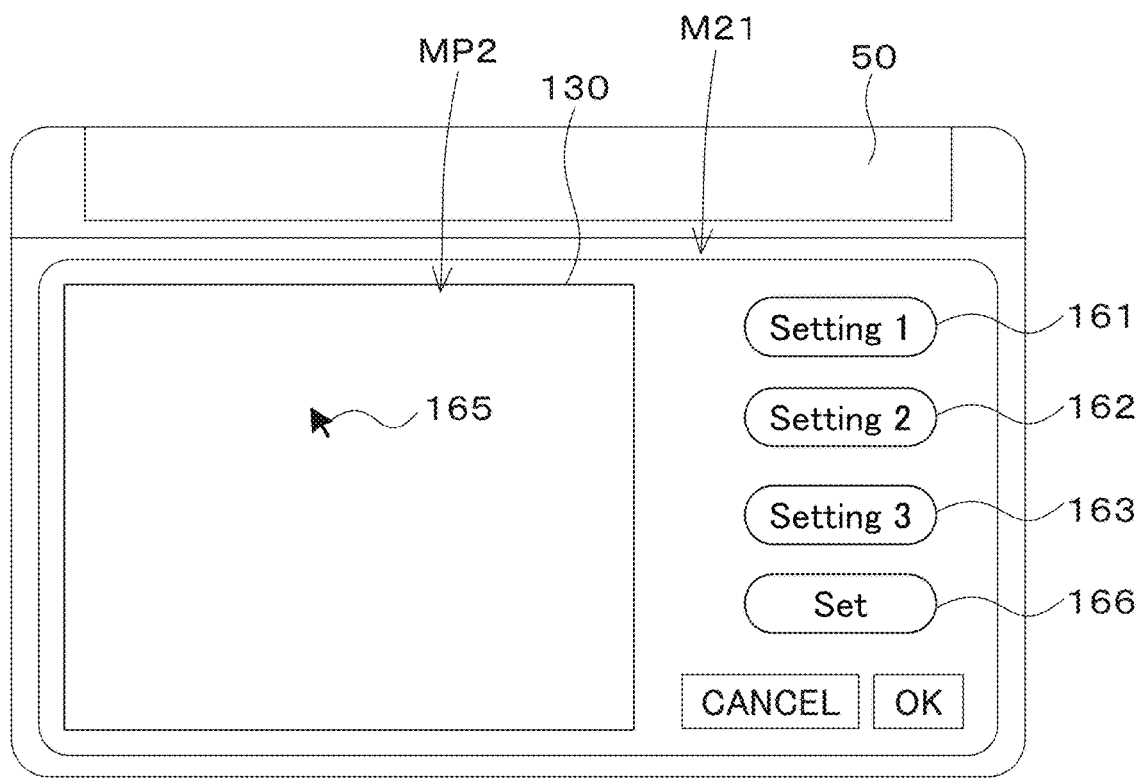
FIG. 7 is a diagram illustrating an example of an area setting screen.

When the operator performs a predetermined operation on the display unit 50, as illustrated in FIG. 7, the travel support device 100 displays an area setting screen M21 on the display unit 50. The area setting screen M21 displays an agricultural field display portion (map display portion) 130 for displaying the agricultural field map MP2 acquired by the map acquisition unit 120. The agricultural field display portion 130 displays, for example, a pointer 165. The pointer 165 is movable across the agricultural field display portion 130, that is, across the agricultural field map MP2.

Figure 8A:
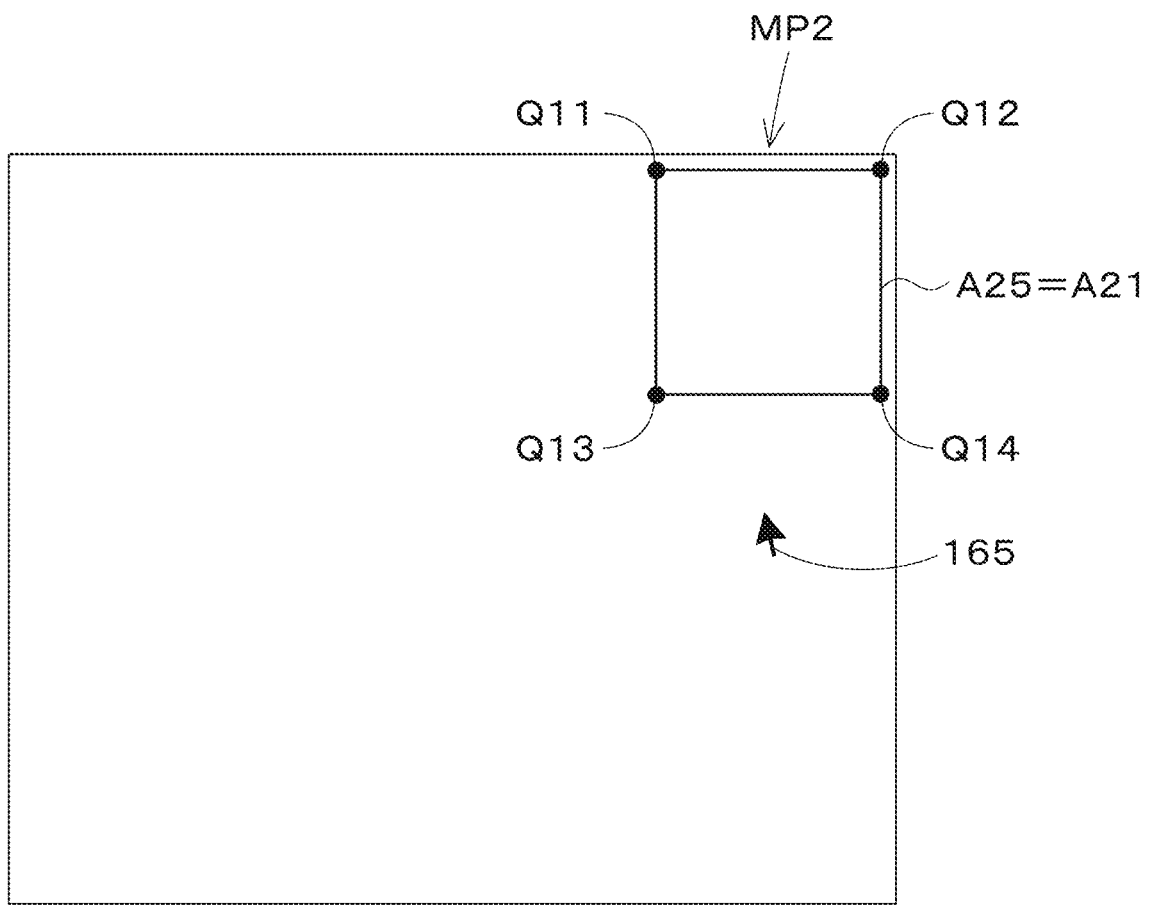
FIG. 8A is a diagram illustrating an example of setting of a first area.

When a first setting button 161 displayed on the area setting screen M21 is selected while the pointer 165 is displayed on the agricultural field map MP2, the travel support device 100 enters a mode for setting the first area A21. As illustrated in FIG. 8A, when a predetermined operation is performed on the agricultural field map MP2 while the pointer 165 is displayed on the agricultural field map MP2, the first area setting unit 141 holds the position of the pointer 165 on the agricultural field map MP2, which is obtained when the predetermined operation is performed, as at least one selected position (selection position) $Q1n$, where n is a selected number and Q1 indicates the setting of the first area. For example, as illustrated in FIG. 8A, when four selection positions Q11, Q12, Q13, and Q14 are selected on the agricultural field map MP2, the first area setting unit 141 creates a setting area A25 that passes through the four selection positions Q11, Q12, Q13, and Q14. In other words, the first area setting unit 141 creates the setting area A25 surrounded by the four selection positions Q11, Q12, Q13, and Q14. When a set button 166 displayed on the area setting screen M21 is selected after the setting area A25 is created, the first area setting unit 141 sets the setting area A25 as the first area A21. As described above, in response to selection of any position on the agricultural field map MP2 using the pointer 165, the first area A21 can be easily set.

Figure 8B:
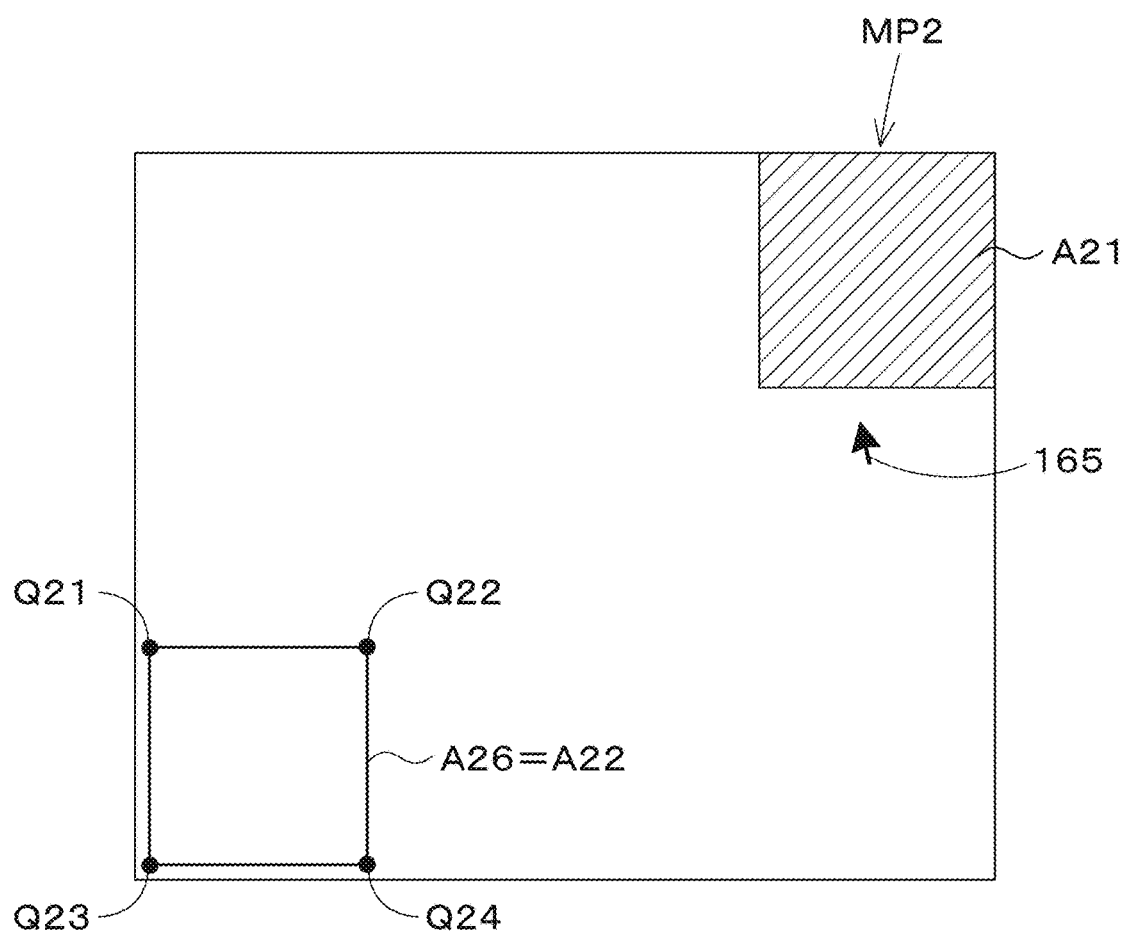
FIG. 8B is a diagram illustrating an example of setting of a second area.

Further, when a second setting button 162 displayed on the area setting screen M21 is selected, the travel support device 100 enters a mode for setting the second area A22. As illustrated in FIG. 8B, when a predetermined operation is performed on the agricultural field map MP2 while the pointer 165 is displayed on the agricultural field map MP2, the second area setting unit 142 holds the position of the pointer 165 on the agricultural field map MP2, which is obtained when the predetermined operation is performed, as at least one selected position (selection position) $Q2n$, where n is a selected number and Q2 indicates the setting of the second area.

In the setting of the second area A22, when the selection position $Q2n$ indicates a position in the first area A21 after the first area A21 has been set, the second area setting unit 142 does not hold the selection position $Q2n$ and displays, in the area setting screen M21, a message indicating that the selection position $Q2n$ is not selectable. In the setting of the second area A22, also when the selection position $Q2n$ indicates a position in the third area A23 after the third area A23 has been set, the second area setting unit 142 does not hold the selection position $Q2n$ and displays, in the area setting screen M21, a message indicating that the selection position $Q2n$ is not selectable.

That is, the second area setting unit 142 sets a portion of the agricultural field map MP2, excluding the first area A21, as a target for setting the second area A22. The second area setting unit 142 further sets a portion of the agricultural field map MP2, excluding the third area A23, as a target for setting the second area A22.

For example, as illustrated in FIG. 8B, when four selection positions Q21, Q22, Q23, and Q24 are selected on the agricultural field map MP2, the second area setting unit 142 creates a setting area A26 that passes through the four selection positions Q21, Q22, Q23, and Q24. In other words, the second area setting unit 142 creates the setting area A26 surrounded by the four selection positions Q21, Q22, Q23, and Q24. When the set button 166 displayed on the area setting screen M21 is selected after the setting area A26 is created, the second area setting unit 142 sets the setting area A26 as the second area A22. As described above, in response to selection of any position on the agricultural field map MP2 using the pointer 165, the second area A22 can be easily set.

If the setting of the first area A21 and the third area A23 has been completed at the time of setting the second area A22, the second area setting unit 142 sets an area of the agricultural field map MP2, excluding the first area A21 and the third area A23, as the second area A22.

Further, when a third setting button 163 displayed on the area setting screen M21 is selected, the travel support device 100 enters a mode for setting the third area A23. As illustrated in FIG. 8C, when a predetermined operation is performed on the agricultural field map MP2 while the pointer 165 is displayed on the agricultural field map MP2, the third area setting unit 143 holds the position of the pointer 165 on the agricultural field map MP2, which is obtained when the predetermined operation is performed, as at least one selected position (selection position) Q3$n$, where n is a selected number and Q3 indicates the setting of the third area. In the setting of the third area A23, when the selection position Q3$n$ indicates a position in the first area A21 after the first area A21 has been set, the third area setting unit 143 does not hold the selection position Q3$n$ and displays, in the area setting screen M21, a message indicating that the selection position Q3$n$ is not selectable. That is, the third area setting unit 143 sets a portion of the agricultural field map MP2, excluding the first area A21, as a target for setting the third area A23. In the setting of the third area A23, also when the selection position Q3$n$ indicates a position in the second area A22 after the second area A22 has been set, the third area setting unit 143 does not hold the selection position Q3$n$ and displays, in the area setting screen M21, a message indicating that the selection position Q3$n$ is not selectable.

That is, the third area setting unit 143 sets a portion of the agricultural field map MP2, excluding the first area A21 and the second area A22, as a target for setting the third area A23.

For example, as illustrated in FIG. 8C, when four selection positions Q31, Q32, Q33, and Q34 are selected on the agricultural field map MP2, the third area setting unit 143 creates a setting area A27 that passes through the four selection positions Q31, Q32, Q33, and Q34. In other words, the third area setting unit 143 creates the setting area A27 surrounded by the four selection positions Q31, Q32, Q33, and Q34. When the set button 166 displayed on the area setting screen M21 is selected after the setting area A27 is created, the third area setting unit 143 sets the setting area A27 as the third area A23. As described above, in response to selection of any position on the agricultural field map MP2 using the pointer 165, the third area A23 can be easily set.

If the setting of the first area A21 and the second area A22 has been completed at the time of setting the third area A23, the third area setting unit 143 sets an area of the agricultural field map MP2, excluding the first area A21 and the second area A22, as the third area A23.

As described above, in response to the first area A21, the second area A22, and the third area A23 being set, the agricultural field map MP2 including the first area A21, the second area A22, and the third area A23 is temporarily stored in the travel support device 100 as a map for route setting.

In the first preferred embodiment described above, an example of setting all of the first area A21, the second area A22, and the third area A23 has been described. However, two areas, for example, the first area A21 and the third area A23, may be set for the agricultural field map MP2 (predetermined agricultural field), or two areas, for example, the second area A22 and the third area A23, may be set for the agricultural field map MP2 (predetermined agricultural field). Alternatively, if the setting of the first area A21 and the second area A22 is not required, only the third area A23 may be set.

In response to the first area A21 and the third area A23 being set, the agricultural field map MP2 including the first area A21 and the third area A23 is temporarily stored in the travel support device 100 as a map for route setting. In response to the second area A22 and the third area A23 being set, the agricultural field map MP2 including the second area A22 and the third area A23 is temporarily stored in the travel support device 100 as a map for route setting. In response to only the third area A23 being set, the agricultural field map MP2 including the third area A23 is temporarily stored in the travel support device 100 as a map for route setting.

In the first preferred embodiment described above, the setting area A25 surrounded by the plurality of selection positions Q1$n$ is set as the first area A21. As alternative to this, the first area A21 may be set using the outline H1 (the outline H1 of the agricultural field) and a selection position Q1$n$ on the agricultural field map MP2.

Figure 9A:
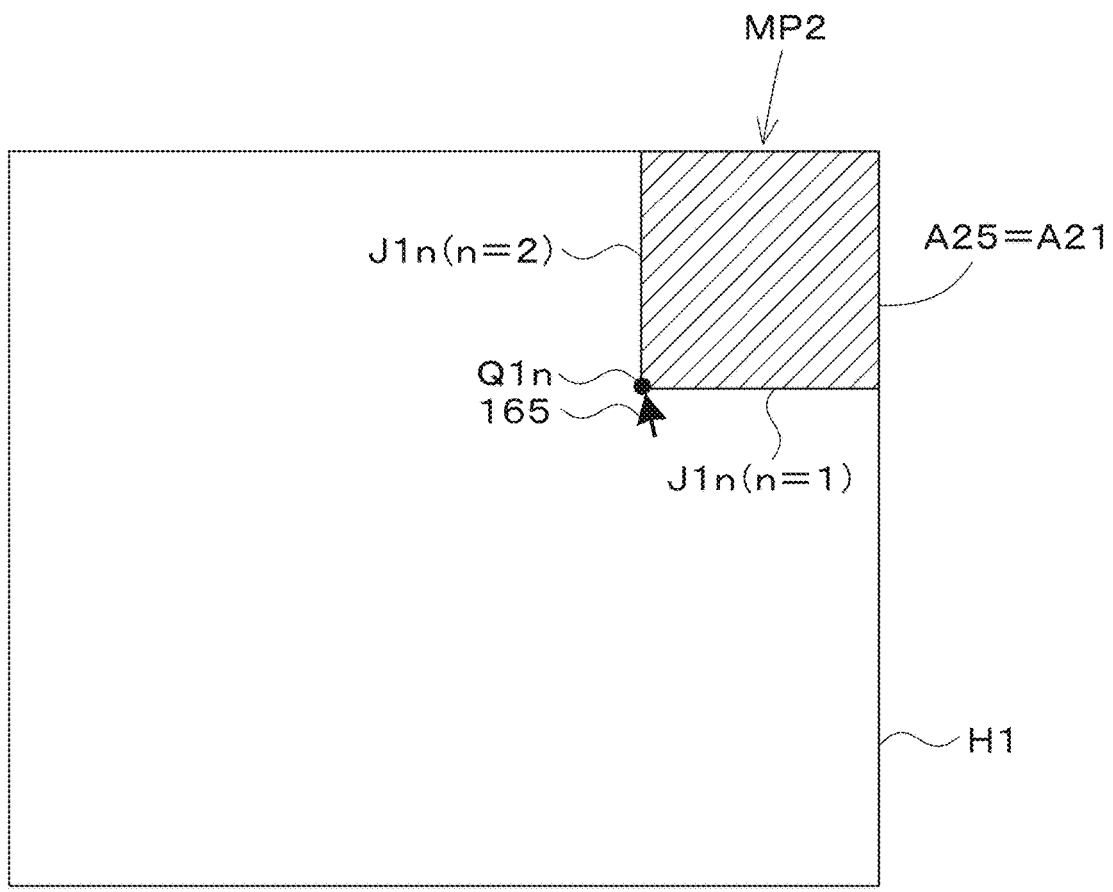
FIG. 9A is a diagram for setting the first area using first region lines.

As illustrated in FIG. 9A, when a selection position Q1$n$ is set using the pointer 165, the first area setting unit 141 generates a plurality of first region lines J1$n$ connecting the selection position Q1$n$ and the outline H1 on the agricultural field map MP2, where n is the number of straight lines. For example, when the selection position Q11 is selected, the first area setting unit 141 generates two first region lines J11 and J12 that pass through the selection position Q11 and that are orthogonal to the outline H1. The first region line J11 and the first region line J12 are straight lines orthogonal to each other, and the first area setting unit 141 creates a setting area A25 surrounded by the first region line J11, the first region line J12, and the outline H1. When the set button 166 displayed on the area setting screen M21 is selected after the setting area A25 is created, the first area setting unit 141 sets the setting area A25 as the first area A21.

As described above, in a modification of the first area A21, the first area A21 can be easily set by setting at least a minimum number of points (one point) set on the agricultural field map MP2.

In the first preferred embodiment described above, the setting area A26 surrounded by the plurality of selection positions Q2$n$ is set as the second area A22. Like the first area A21, the second area A22 may be set using the outline H1 (the outline H1 of the agricultural field) and a selection position Q2$n$ on the agricultural field map MP2.

Figure 9B:
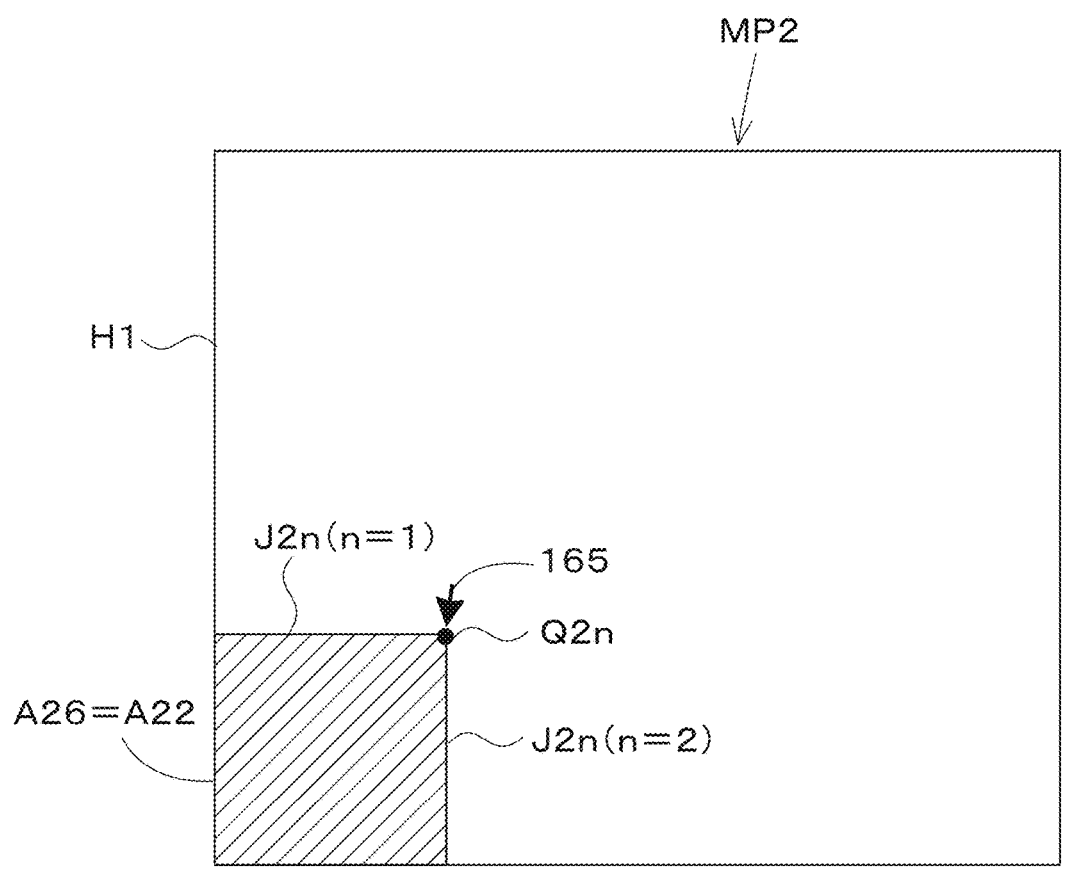
FIG. 9B is a diagram for setting the second area using second region lines.

As illustrated in FIG. 9B, when a selection position Q2$n$ is set using the pointer 165, the second area setting unit 142 generates a plurality of second region lines J2n connecting the selection position Q2n and the outline H1 on the agricultural field map MP2, where n is the number of straight lines. For example, when the selection position Q21 is selected, the second area setting unit 142 generates two second region lines J21 and J22 that pass through the selection position Q21 and that are orthogonal to the outline H1. The second region line J21 and the second region line J22 are straight lines orthogonal to each other, and the second area setting unit 142 creates a setting area A26 surrounded by the second region line J21, the second region line J22, and the outline H1. When the set button 166 displayed on the area setting screen M21 is selected after the setting area A26 is created, the second area setting unit 142 sets the setting area A26 as the second area A22.

As described above, in a modification of the second area A22, the second area A22 can be easily set by setting at least a minimum number of points (one point) on the agricultural field map MP2.

Figure 10:
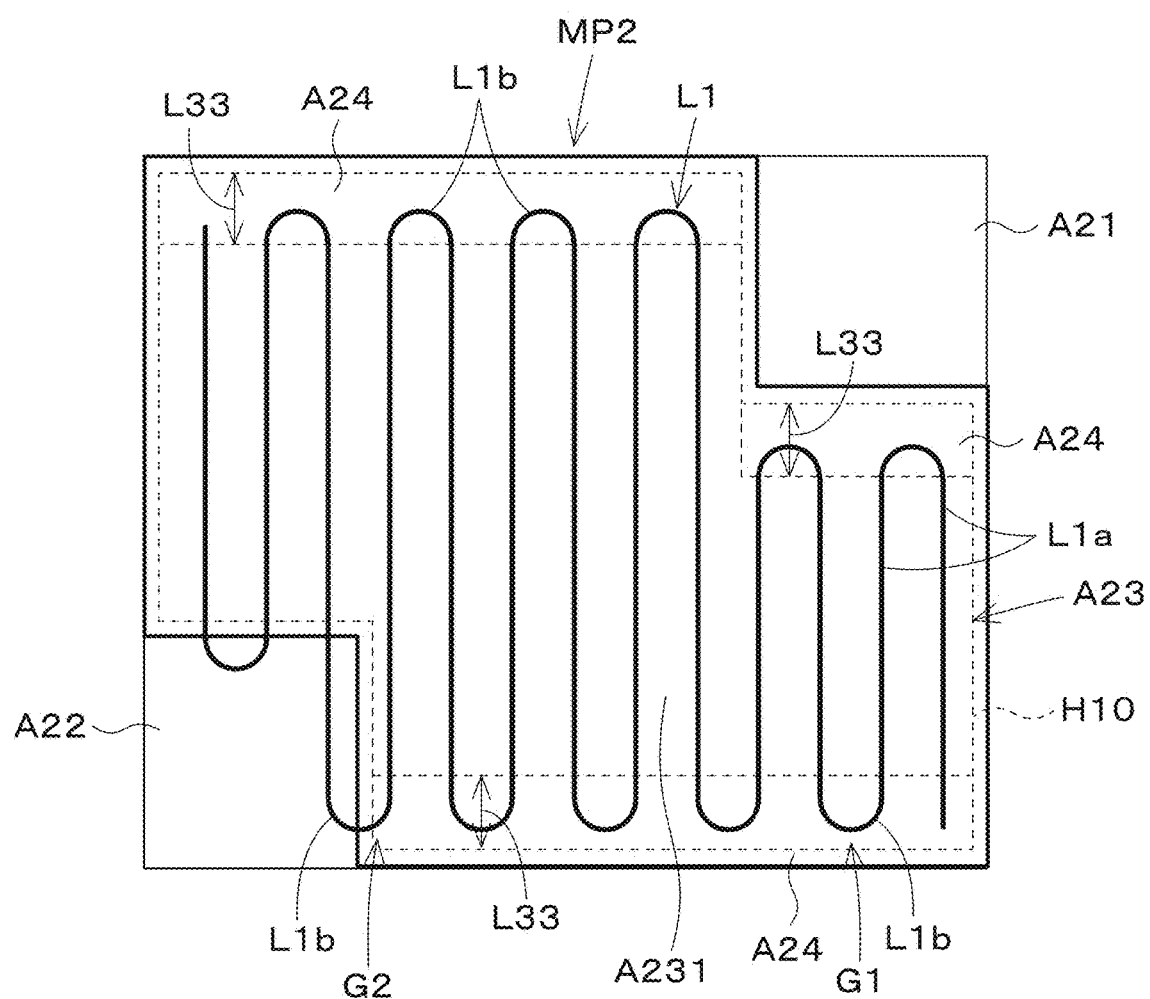

On the agricultural field map MP2, the travel route L1 of the traveling vehicle 3 can be created at least in the third area A23 (see FIG. 10).

As illustrated in FIG. 1, the travel support device 100 includes a route creation unit 105 and a route storage unit 106. The route creation unit 105 creates the travel route L1 in the agricultural field. The route creation unit 105 is implemented by electric and electronic components disposed in the travel support device 100 and a program incorporated in the travel support device 100, for example. The route storage unit 106 stores the travel route L1 created by the route creation unit 105. The route storage unit 106 is implemented by a non-volatile memory or the like.

First, creation of the travel route L1 in the agricultural field, which is performed by the route creation unit 105, will be described. As illustrated in FIG. 10, the route creation unit 105 reads a map for route setting, which is temporarily saved in the travel support device 100, and sets at least one turning area A24 in the third area A23 of the read agricultural field map MP2. The turning area A24 is an area in which the traveling vehicle 3 turns. For example, in the third area A23, the turning area A24 is set between an outline H10 of the third area A23 and a position that is a predetermined distance L33 away from the outline H10. If the read agricultural field map MP2 includes the second area A22, the route creation unit 105 also sets the second area A22 as a turning area A24. In the setting of turning areas A24, the route creation unit 105 sets the turning areas A24 so that the turning areas A24 on both ends of the third area A23 face each other.

The route creation unit 105 includes a straight traveling section creation unit 105A and a turning section creation unit 105B. The straight traveling section creation unit 105A creates at least one straight traveling section (straight traveling route) L1a in a portion A231 of the third area A23, excluding the turning areas A24. The straight traveling section L1a is a section along which the traveling vehicle 3 travels straight. A plurality of straight traveling sections L1a are arranged horizontally or vertically in the portion A231 excluding the turning areas A24.

The turning section creation unit 105B creates at least one turning section (turning route) L1b in the turning areas A24 of the third area A23. The turning section L1b is a section along which the traveling vehicle 3 turns. As indicated by an arrow G1 in FIG. 10, for example, the turning section creation unit 105B connects ends of adjacent straight traveling sections L1a to create turning sections L1b in the turning areas A24 of the third area A23. As indicated by an arrow G2 in FIG. 10, if ends of adjacent straight traveling sections L1a are not connectable only within the turning area A24 of the third area A23, the turning section creation unit 105B creates a turning section L1b such that the turning section L1b extends over both the turning area A24 of the third area A23 and the turning area A24 of the second area A22. That is, the turning section creation unit 105B creates the turning sections L1b in the second area A22 and/or the third area A23. As described above, the travel route L1 (the straight traveling sections L1a and the turning sections L1b) created by the route creation unit 105 is stored in the route storage unit 106. The travel route L1 is further displayed on the display unit 50 together with the agricultural field map MP2.

Figure 11A:
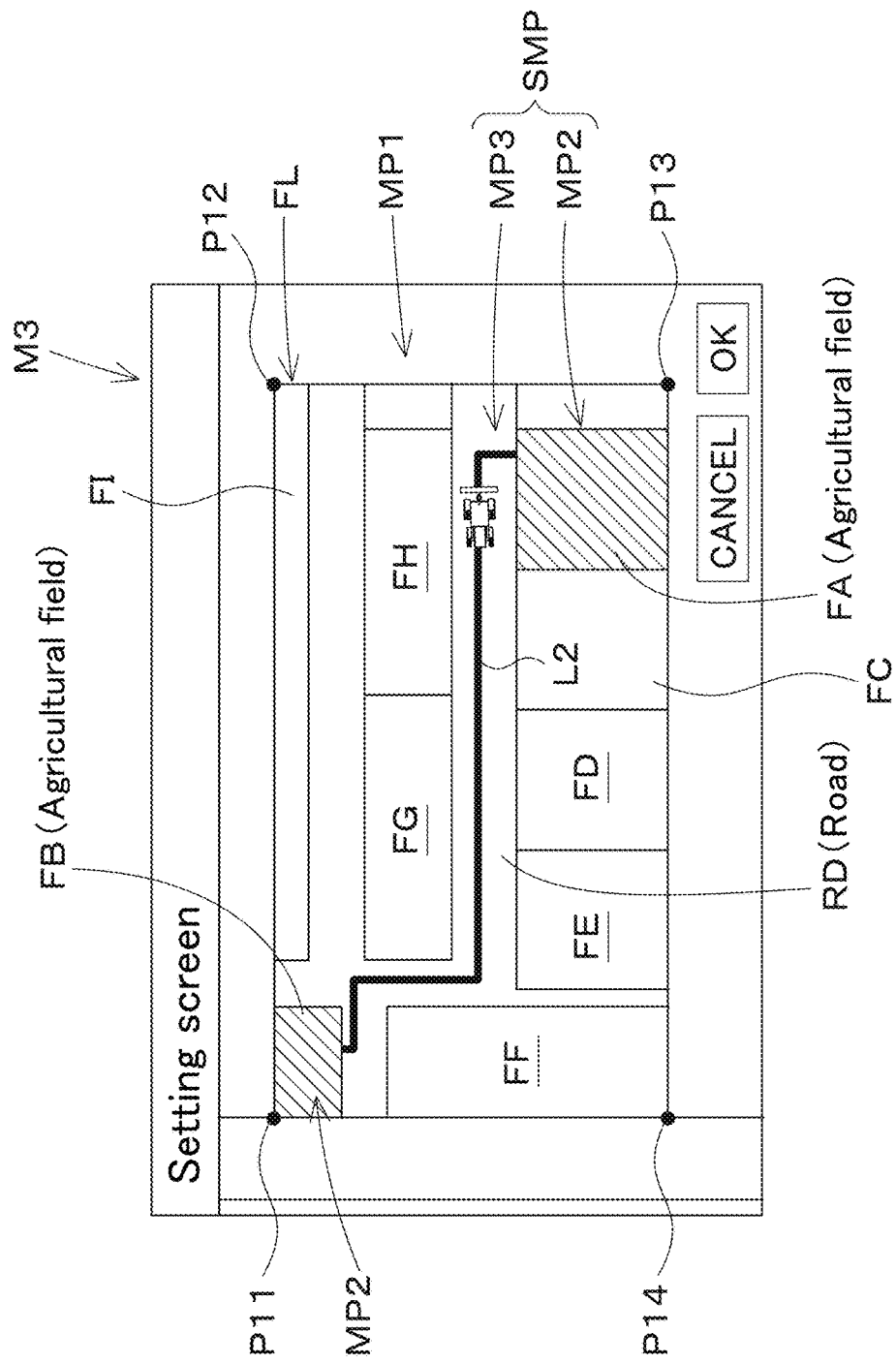
FIG. 11A is a diagram illustrating how a tractor moves by automatic operation from one agricultural field to another agricultural field.

The route creation unit 105 is capable of creating, in addition to the travel route L1 in the agricultural field described above, the road travel route L2 for traveling on a road between agricultural fields. Creation of the road travel route L2, which is performed by the route creation unit 105, will be described. For example, in some cases, the tractor 1 is caused to move from one agricultural field to another agricultural field by automatic operation. FIG. 11A is a diagram illustrating how the tractor 1 moves by automatic operation from an agricultural field FA to an agricultural field FB. As illustrated in FIG. 11A, to cause the tractor 1 to move from the agricultural field FA to the agricultural field FB by automatic operation, the route creation unit 105 creates the road travel route L2 (planned road travel route) from the agricultural field FA to the agricultural field FB. Specifically, when the operator or the like performs a predetermined operation on the display unit 50, the controller 60 displays a setting screen M3 for setting the road travel route L2. The setting screen M3 has a field portion FL that displays the map MP1 having the plurality of agricultural field maps MP2 (including the agricultural field maps MP2 of the agricultural field FA, the agricultural field FB, etc.).

In response to the operator or the like operating the display unit 50, the route creation unit 105 creates, on the map MP1 displayed in the field portion FL, the road travel route L2 from the agricultural field FA to the agricultural field FB. In the map MP1, the agricultural fields FA to FI and non-agricultural-field regions are each associated with position information (latitude and longitude). The route storage unit 106 stores the road travel route L2. When the route creation unit 105 creates the road travel route L2, the map registration unit 101 sets a region including the road travel route L2 as a road RD, and stores a road map MP3 including the position information of the road travel route L2 and the road RD in the map storage unit 102. Examples of the road RD include an automobile road, a forest road, and a farm road. The map storage unit 102 stores the road map MP3 (including the road travel route L2 and the road RD) in addition to the agricultural field maps MP2 and data indicating the outlines of the agricultural fields (data for representing the predetermined agricultural fields). Further, the map registration unit 101 causes the map storage unit 102 to store an aggregate map SMP, which is obtained by aggregation of the agricultural field maps MP2 and the road map MP3. As described above, when the road travel route L2 is created, the automatic travel control unit 61 performs control of straight-line automatic operation so that the tractor 1 travels along the road travel route L2.

In the first preferred embodiment described above, the road travel route L2 is created in response to the operator or the like operating the display unit 50. Alternatively, in response to the operator or the like selecting the agricultural field FA as a departure place and the agricultural field FB as a destination place on the setting screen M3, the controller 60 may automatically set the road travel route L2.

As illustrated in FIG. 1, the tractor 1 includes a communication device 55 (first communication device). The communication device 55 is a communication module configured to perform either direct communication or indirect communication with a communication device 83 of the transport vehicle 80 and is capable of performing wireless communication via, for example, a communication protocol such as Wireless Fidelity (Wi-Fi (registered trademark)) under the IEEE 802.11 series, Bluetooth (registered trademark) Low Energy (BLE), Low Power Wide Area (LPWA), or Low-Power Wide-Area Network (LPWAN). The communication device 55 is further capable of performing wireless communication using, for example, a mobile phone communication network or a data communication network.

The communication device 55 transmits information on the tractor 1 to the transport vehicle 80 under the control of the controller 60 or the travel support device 100. Examples of the information on the tractor 1 include information such as the position of the tractor 1 measured by the positioning device 40, the travel route (including the travel route L1 in the agricultural field and the road travel route L2) created by the route creation unit 105, the aggregate map SMP (first map) stored in the map storage unit 102 (first storage device), and previous trajectory information of the tractor 1.

Further, the controller 60 of the tractor 1 or a controller 811 of the transport vehicle 80 may acquire update vehicle size class information, based on first vehicle size class information of the agricultural machine (the overall height, the overall length, the overall width, and the gross weight of the tractor 1 and the working device 2) and second vehicle size class information of the transport vehicle 80 (the overall height, the overall length, the overall width, and the gross weight of the transport vehicle 80). For example, the communication device 55 of the tractor 1 may transmit the first vehicle size class information of the agricultural machine from the tractor 1 to the transport vehicle 80 under the control of the controller 60 or the travel support device 100. The controller 811 of the transport vehicle 80 calculates update vehicle size class information, based on the first vehicle size class information of the agricultural machine, which is transmitted from the tractor 1, and the second vehicle size class information of the transport vehicle 80, which is stored in a storage device 813 in advance. The update vehicle size class information is vehicle size class information including the sum of information on the agricultural machine and information on the transport vehicle 80 when the agricultural machine is loaded on the transport vehicle 80, and includes information on at least one of the overall height, the overall length, the overall width, or the gross weight. The overall height is a higher one of a height obtained by adding up the height of a platform 80a of the transport vehicle 80 and the height of the agricultural machine (the height of the taller one among the tractor 1 and the working device 2 when the working device 2 is included, or the height of the tractor 1 when the working device 2 is not included) and the overall height of the transport vehicle 80. The overall length is a length that matches the overall length of the transport vehicle 80 as measured in the front-rear direction thereof since the agricultural machine fits within the area of the platform 80a. The overall width is a width that matches the overall width of the transport vehicle 80 since the agricultural machine fits within the area of the platform 80a. The gross weight is a weight obtained by adding up the weight of the transport vehicle 80 and the weight of the agricultural machine (the total weight of the tractor 1 and the working device 2 when the working device 2 is included, or the weight of the tractor 1 when the working device 2 is not included). The communication device 83 may transmit the second vehicle size class information of the transport vehicle 80 to the tractor 1, and the controller 60 may calculate update vehicle size class information, based on the first vehicle size class information of the agricultural machine and the second vehicle size class information of the transport vehicle 80 and transmit the update vehicle size class information from the tractor 1 to the transport vehicle 80.

Figure 11B:
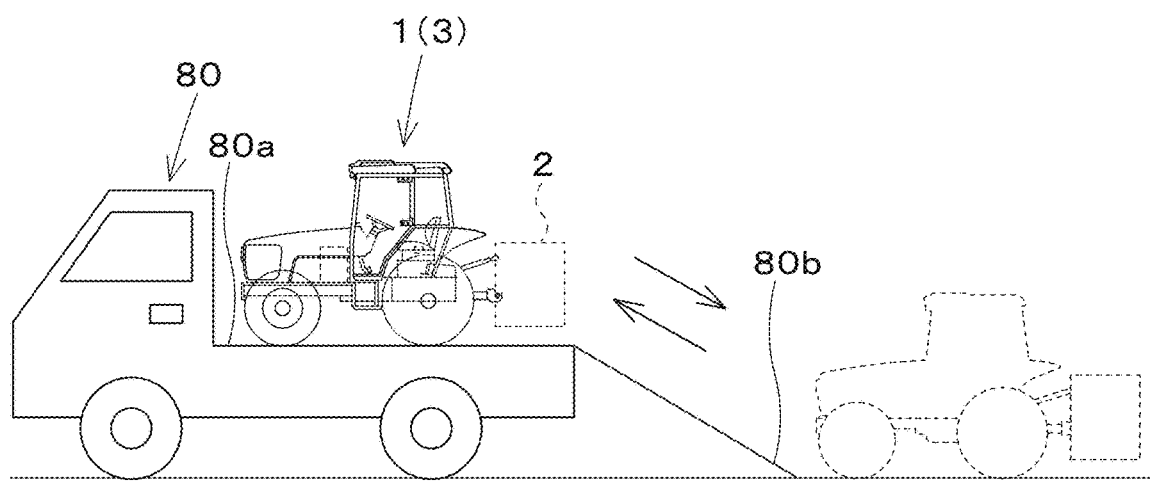
FIG. 11B is a side view of a transport vehicle loaded with the tractor.

Next, the transport vehicle 80 will be described. The transport vehicle 80 is a vehicle (for example, a truck) capable of transporting the tractor 1. The transport vehicle 80 is capable of loading or unloading the tractor 1 on or from the platform by allowing the tractor 1 to pass through a running board installed at an end of the platform. As illustrated in FIG. 11B, the tractor 1 is loaded on the transport vehicle 80 and moves to a predetermined agricultural field or the like. In the following description, it is assumed that the tractor 1 is loaded on the platform 80a of the transport vehicle 80 by passing through a running board 80b, and is transported by the transport vehicle 80.

As illustrated in FIG. 1, the transport vehicle 80 includes a car navigation device 81, a switch 82 (instruction unit), the communication device 83 (second communication device), the storage device 813 (second storage device), and a display device 814.

The car navigation device 81 is a device that provides notification of the current position and route guidance to a destination during traveling of the transport vehicle 80, for example. The car navigation device 81 includes the controller 811 and a positioning device 812. The car navigation device 81 may include the controller 811, the positioning device 812, the storage device 813 (second storage device), and the display device 814.

The controller 811 is a device that performs control of car navigation display, and includes a CPU and electric and electronic circuits, for example. The positioning device 812 is capable of detecting the position thereof (measured position information including latitude and longitude) by using a known satellite positioning system (positioning satellites). That is, the positioning device 812 receives satellite signals (positions of the positioning satellites, transmission times, correction information, etc.) transmitted from the positioning satellites, and detects the position (for example, the latitude and longitude) of the transport vehicle 80, based on the satellite signals. The storage device 813 is implemented by a non-volatile memory or the like, and stores in advance a map LMP obtained from a map provider company or the like (see FIG. 13 and FIG. 15 described below), and the like. The storage device 813 further stores in advance a reference pattern image for pattern matching, which represents a road, a building, or the like. The display device 814 is a liquid crystal display device or the like, and displays the current position of the transport vehicle 80 (the position detected by the positioning device 812) on the map LMP acquired from the storage device 813.

The switch 82 is a mechanical switch to be operated by the operator to request transmission of the information on the tractor 1. The switch 82 is disposed in an operator's seat of the transport vehicle 80 at a position where the operator in the operator's seat can operate the switch 82.

The communication device 83 is a device capable of receiving information from the communication device 55 of the tractor 1. The communication device 83 is a communication module configured to perform either direct communication or indirect communication with the communication device 55 of the tractor 1 and performs wireless communication via, for example, a communication protocol such as Wi-Fi (registered trademark) under the IEEE 802.11 series, BLE, LPWA, or LPWAN.

All or some of the car navigation device 81, the display device 814, the storage device 813, the switch 82, and the communication device 83 may be included in a portable terminal (or mobile terminal) such as a tablet, a smartphone, or a PDA, for example. For example, a mobile terminal may include the car navigation device 81, or a mobile terminal may include the car navigation device 81, the display device 814, the storage device 813, the switch 82, and the communication device 83. Alternatively, the controller 811 and the positioning device 812 may be mounted on the transport vehicle 80, and the display device 814 may be an external terminal (monitor).

Figure 12:
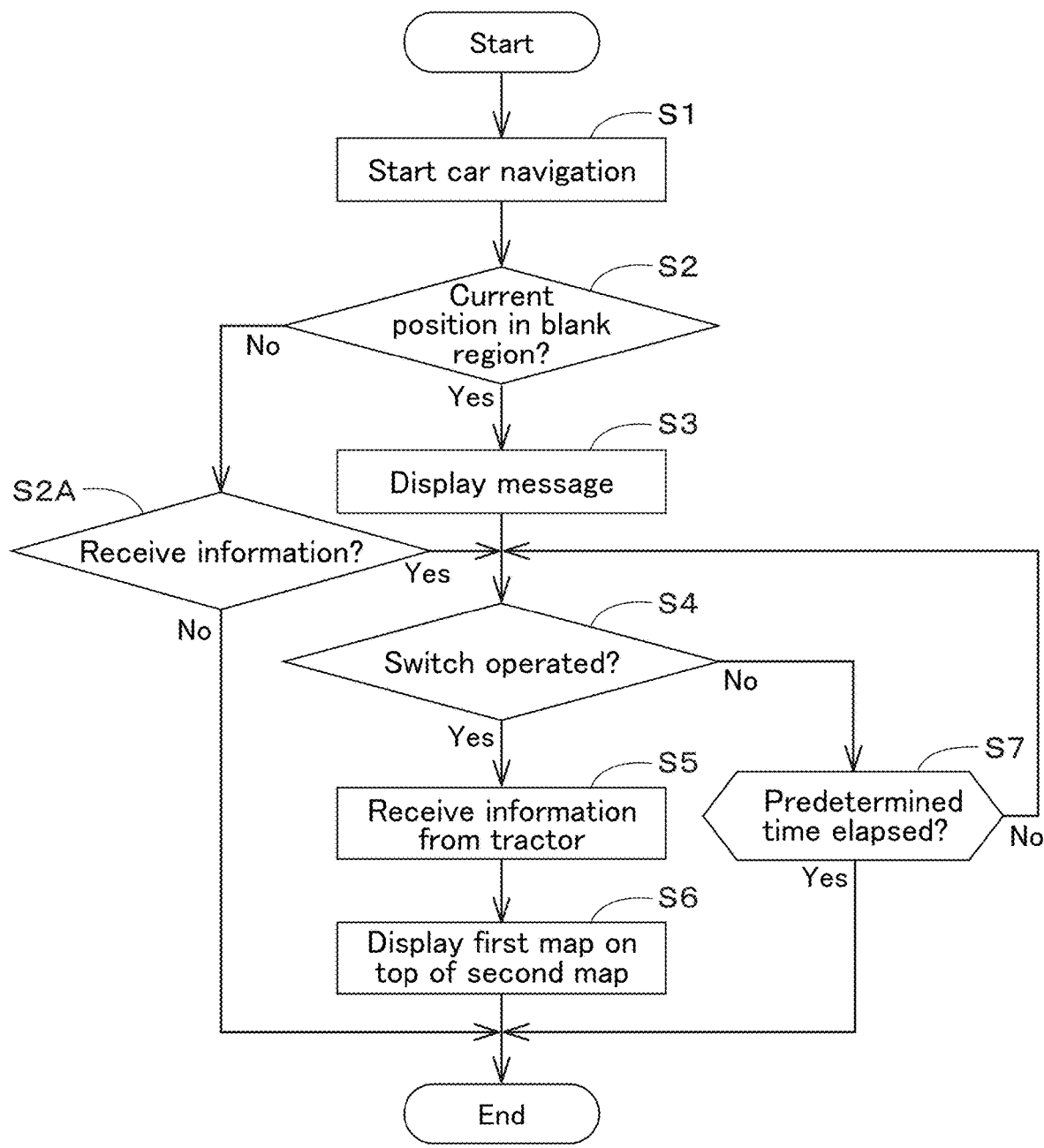
FIG. 12 is a flowchart illustrating a navigation process performed by the transport vehicle in the agricultural support system.

FIG. 12 is a flowchart illustrating a navigation process performed by a transport vehicle in an agricultural support system. A description will be given of an example in which the agricultural machine (the tractor 1) is loaded on the transport vehicle 80, the communication device 55 of the tractor 1 is in a communicable state, and the car navigation device 81 of the transport vehicle 80 is used to provide route guidance to the transport vehicle 80 to navigate to a destination.

The controller 811 of the car navigation device 81 starts car navigation in response to a start operation performed by the operator (for example, an operation of starting an engine of the transport vehicle 80, an operation of turning on power supply to the transport vehicle 80, or a car navigation start operation) (S1). Specifically, the controller 811 acquires the map LMP including the current position of the transport vehicle 80 (see FIG. 13 and FIG. 15) from the storage device 813, and causes the display device 814 to display the acquired map LMP and the current position of the transport vehicle 80 on the map LMP.

Figure 13:
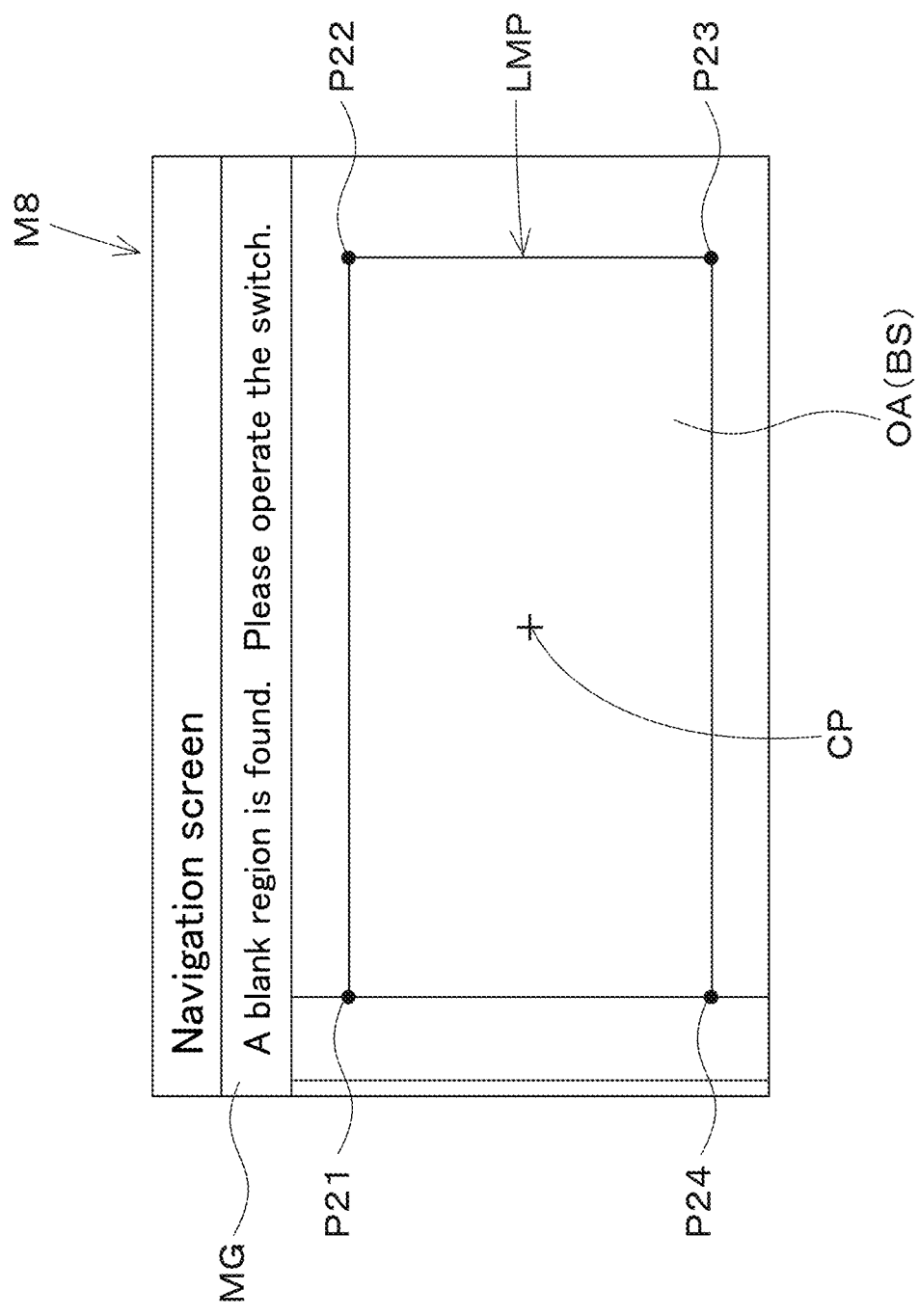
FIG. 13 is a diagram illustrating an example of a navigation screen presented on a display device of the transport vehicle.

In one example, a navigation screen M8 illustrated in FIG. 13 is displayed on the display device 814 of the transport vehicle 80. On the navigation screen M8 illustrated in FIG. 13, a cross pointer CP indicating the current position of the transport vehicle 80 is displayed in, for example, a rectangular blank region BS having positions P21 to P24 as corners. The map LMP, which is acquired by the car navigation device 81 from a map provider company or the like and stored in the storage device 813, may include regions having no map information, such as an agricultural field and a farm road leading to the agricultural field. As illustrated in FIG. 13, the blank region BS may be displayed. That is, the navigation screen M8 may display no map information on the surroundings of the transport vehicle 80. The blank region BS is a region that does not include the outlines of a road, a building, and the like, and has a size greater than or equal to a predetermined specified value (for example, 1 hectare). The blank region BS is not limited to a rectangular region, for example, and may have any shape.

Not only when the current position of the transport vehicle 80 is in the blank region BS but also when a region around the destination of the transport vehicle 80 is in the blank region BS or when the blank region BS lies in a route from the current position of the transport vehicle 80 to the destination, as described below, the controller 811 may cause the display device 814 to display a composite map GMP, which is obtained by superimposing the aggregate map SMP (first map) transmitted from the tractor 1 on the map LMP (second map) stored in the storage device 813.

The controller 811 determines whether the cross pointer CP indicating the current position of the transport vehicle 80 is in the blank region BS having no map information (S2). Specifically, the controller 811 performs known pattern matching processing to determine whether an image of a rectangular region OA in which the cross pointer CP is located on the map LMP displayed on the display device 814 includes the reference pattern image for pattern matching (the image indicating a road, a building, or the like) stored in the storage device 813. If the reference pattern image is not included, the controller 811 determines that the region OA in which the cross pointer CP is located is a candidate region. If the reference pattern image is included, the controller 811 determines that the region OA in which the cross pointer CP is located is not a candidate region. The controller 811 may make a determination not only by performing pattern matching but also by determining whether information on a layer required for traveling of the transport vehicle 80, such as a road or a building in map information, is stored. If it is determined that the region OA is a candidate region, the controller 811 determines whether the area of the candidate region (i.e., the area of the region OA) is greater than or equal to a predetermined specified value (for example, 1 hectare). The controller 811 calculates the area of the candidate region using the position information indicating the latitude and longitude included in the map LMP, the position information of the cross pointer CP, and information indicating the outline of the candidate region. If the calculated area of the candidate region is greater than or equal to the predetermined specified value, the controller 811 determines that the candidate region is the blank region BS (Yes in S2). If the calculated area of the candidate region is less than the predetermined specified value, the controller 811 determines that the candidate region is not the blank region BS (No in S2). The controller 811 may determine whether a length of the region OA whose area is assumed to be greater than or equal to the predetermined specified value (for example, 1 hectare), such as the length of one side of the candidate region or the length of a diagonal line of the candidate region, is greater than or equal to a predetermined specified value (for example, 100 m).

If No is determined in S2, the controller 811 causes the display device 814 to display a message indicating that the current position (or selected point) is not in the blank region BS, but indicating whether to receive information from the tractor 1 (S2A). Upon an operation of selecting an instruction button (not illustrated) corresponding to "receiving information from the tractor 1" (Yes in S2A), the process proceeds to S4. In this case, the demand for preferentially using the information on the tractor 1 even if the current position is not in the blank region BS can be addressed.

Figure 14:
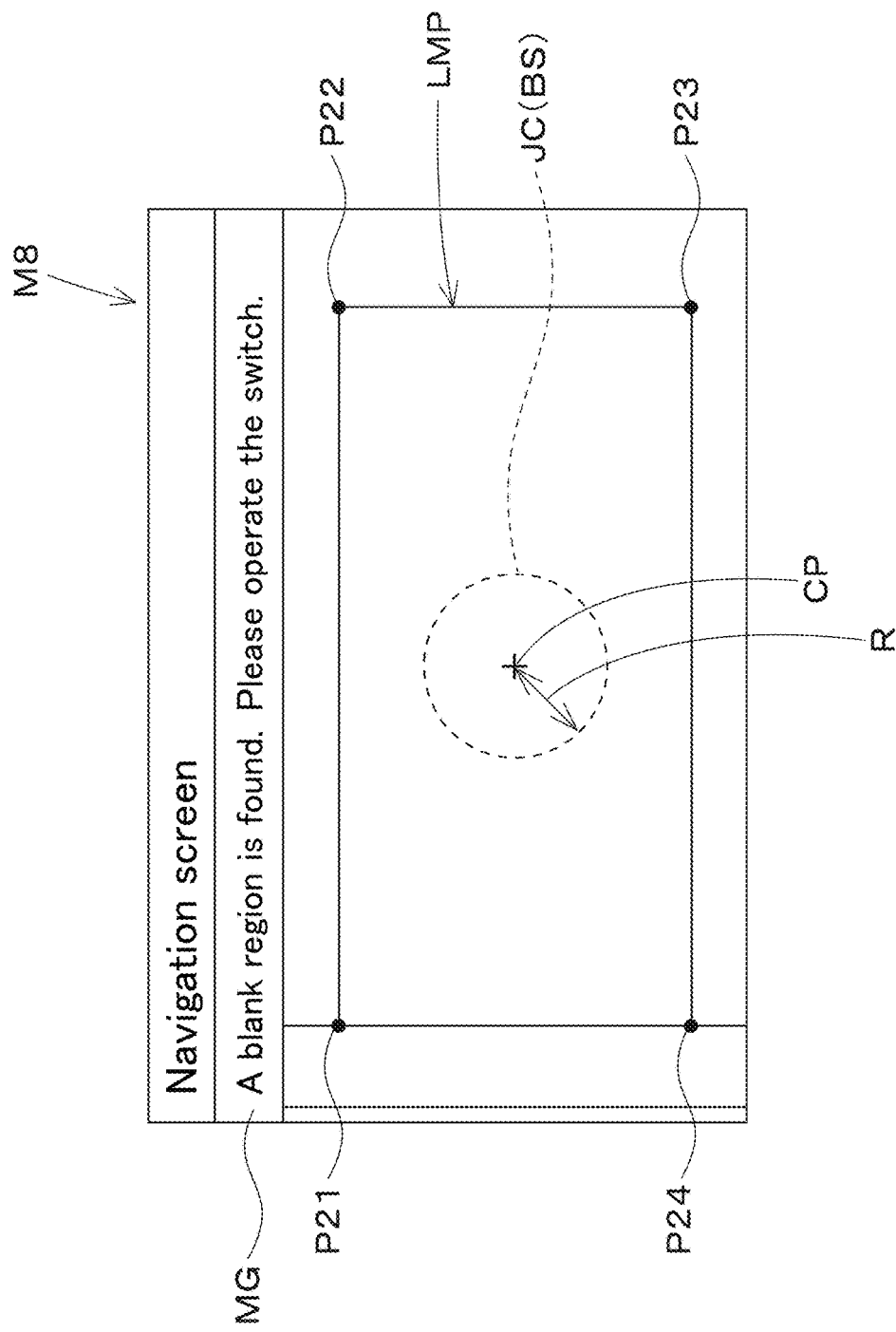
FIG. 14 is a diagram illustrating an example of a navigation screen presented on the display device of the transport vehicle.

If the blank region BS includes no outline, as illustrated in FIG. 14, the controller 811 may determine whether the current position is in the blank region BS by using a circular determination region JC centered on the cross pointer CP and having an area equal to a predetermined specified value (for example, 1 hectare). Specifically, the controller 811 can set the determination region JC on the map LMP by using the position information indicating the latitude and longitude included in the map LMP, the position information of the cross pointer CP, and a predetermined radius R of the circular determination region JC (a radius of a circle having an area equal to a predetermined specified value). The controller 811 performs known pattern matching processing to determine whether an image of the determination region JC centered on the cross pointer CP on the map LMP displayed on the display device 814 includes the reference pattern image for pattern matching (the image indicating a road, a building, or the like) stored in the storage device 813. If the reference pattern image is not included in the determination region JC, the controller 811 determines that the determination region JC is the blank region BS (Yes in S2). If the reference pattern image is included in the determination region JC, the controller 811 determines that the determination region JC is not the blank region BS (No in S2). As described above, the use of the determination region JC makes it possible to determine whether the current position is in the blank region BS even if the blank region BS includes no outline. The determination region JC may have a rectangular shape.

If the cross pointer CP indicating the current position of the transport vehicle 80 is in the blank region BS having no map information (Yes in S2), the controller 811 causes a message MG to be displayed on the navigation screen M8 illustrated in FIG. 13 or FIG. 14 to prompt the operator to perform an operation for receiving information from the tractor 1 (S3). The message MG is, for example, a message indicating "A blank region is found. Please operate the switch to receive information from the tractor".

If the operator determines that the map LMP displayed on the display device 814 of the transport vehicle 80 is insufficient and the operator selects the instruction button (not illustrated) corresponding to "receiving information from the tractor 1" (Yes in S2A) or if the operator views the message MG on the display device 814 (S3), the operator operates the switch 82. If Yes is determined in S2, the controller 811 determines whether the switch 82 is operated within a predetermined time (for example, 30 seconds) from a time point at which the display of the message MG on the display device 814 is started in S3 or from a time point at which the instruction button (not illustrated) corresponding to "receiving information from the tractor 1" is selected if Yes is determined in S2A (S4). If the switch 82 is operated (Yes in S4), the controller 811 transmits a request signal to the tractor 1 through the communication device 83 to request transmission of the information on the tractor 1. The request signal includes a transmission request signal and position information of the blank region BS. If the operator determines that the map LMP displayed on the display device 814 of the transport vehicle 80 is insufficient and the operator performs an instruction operation corresponding to "receiving information from the tractor 1" (Yes in step S2A), the process may proceed to step S5, and the controller 811 may transmit a request signal to the tractor 1 through the communication device 83 to request transmission of the information on the tractor 1.

Upon receiving the request signal from the transport vehicle 80, the communication device 55 of the tractor 1 transmits the information on the tractor 1 under the control of the controller 60 or the travel support device 100. Examples of the information on the tractor 1 include information such as the current position of the tractor 1, which is measured by the positioning device 40, a travel route to be superimposed on the blank region BS among the travel route L1 and the road travel route L2 stored in the route storage unit 106, and a map to be superimposed on the blank region BS in the aggregate map SMP (first map) stored in the map storage unit 102.

The communication device 83 of the transport vehicle 80 receives the information on the tractor 1 (S5). When the aggregate map SMP (first map) is transmitted from the tractor 1 (agricultural machine), the controller 811 causes the aggregate map SMP (first map) to be displayed on top of the map LMP (second map) stored in the storage device 813 (S6). For example, the controller 811 causes the display device 814 to display the composite map GMP, which is obtained by superimposing the aggregate map SMP at a position corresponding to the aggregate map SMP in the map LMP.

Specifically, as illustrated in FIG. 11A, the aggregate map SMP is a rectangular map obtained by aggregation of the agricultural field map MP2 and the road map MP3, and has four corners whose positions correspond to positions P11 to P14. The positions P11 to P14 are each position data specified by latitude and longitude. Since the map LMP stored in the storage device 813 includes position information indicating latitude and longitude, the controller 811 specifies positions on the map LMP that match the positions P11 to P14 of the aggregate map SMP illustrated in FIG. 11A. As illustrated in FIG. 13, the positions P21 to P24 of the map LMP displayed on the navigation screen M8 match the positions P11 to P14 of the aggregate map SMP illustrated in FIG. 11A, respectively.

Figure 15:
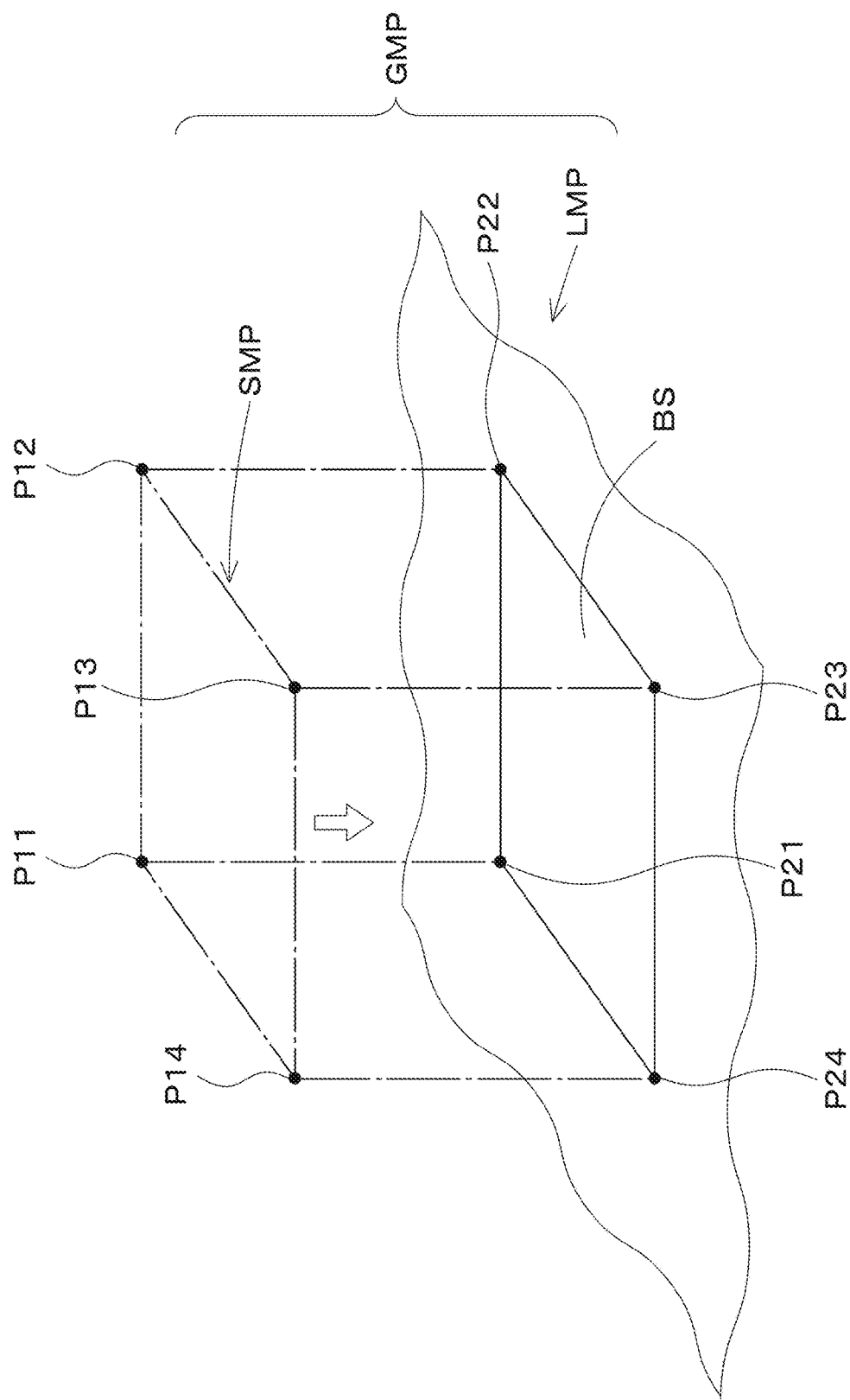
FIG. 15 is a diagram illustrating an example of superimposing a first map from an agricultural machine on a second map presented on a car navigation device to create a composite map.
Figure 16:
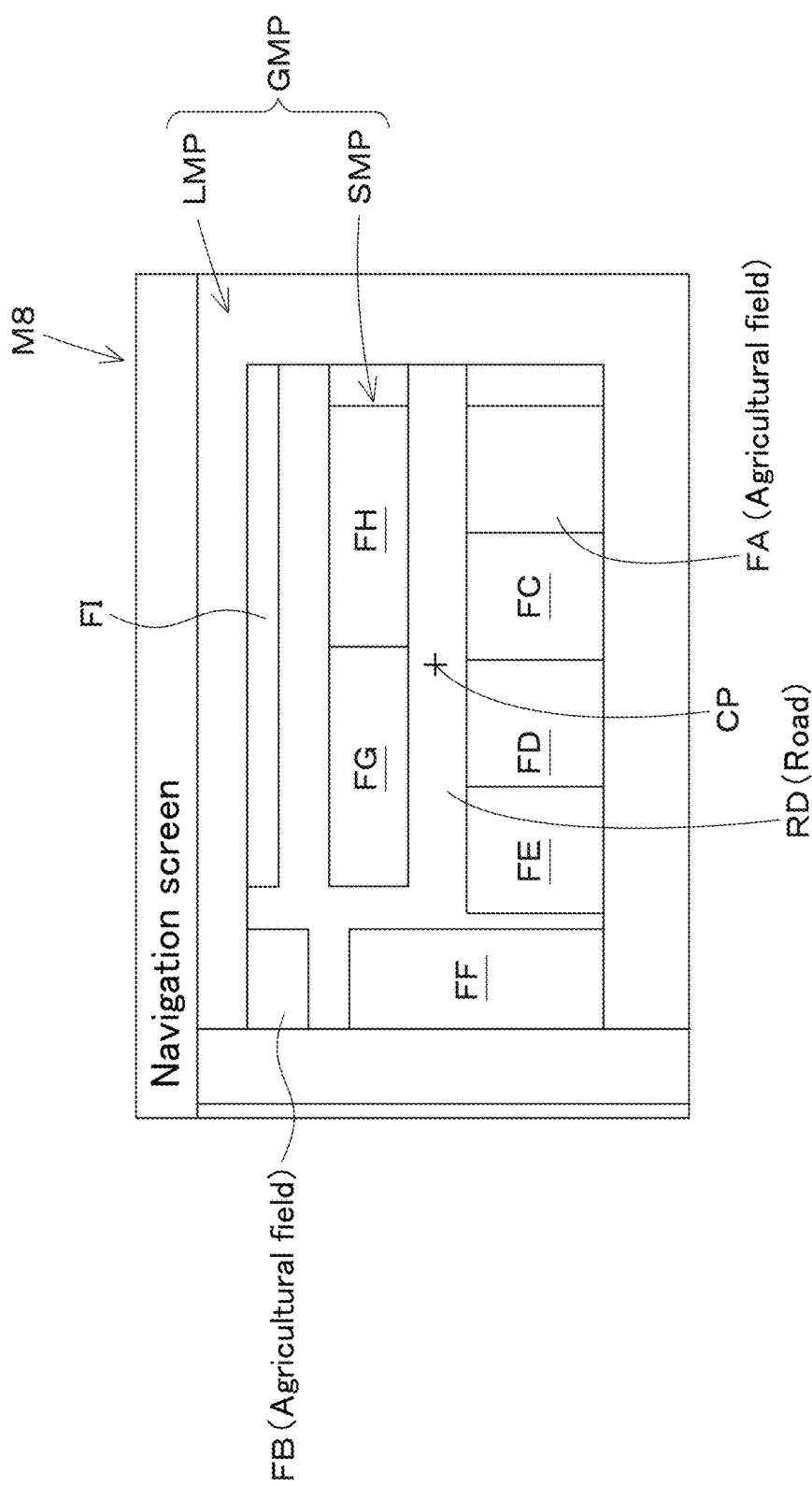
FIG. 16 is a diagram illustrating an example of the composite map displayed on the navigation screen presented on the display device of the transport vehicle.

As illustrated in FIG. 15, the controller 811 superimposes the aggregate map SMP (first map) on the map LMP so as to make the positions P21 to P24 of the map LMP (second map) stored in the storage device 813 match the positions P11 to P14 of the aggregate map SMP illustrated in FIG. 11A, respectively, to create the composite map GMP. The travel support device 100 of the tractor 1 may receive the map LMP (second map) from the communication device 83 of the transport vehicle 80, create the composite map GMP, and transmit the composite map GMP to the communication device 83 of the transport vehicle 80. The controller 811 stores the composite map GMP in the storage device 813, and causes the display device 814 to display the composite map GMP, as illustrated in FIG. 16. As described above, the display device 814 of the transport vehicle 80 can display map information that is not included in the transport vehicle 80, or map information that is included in the tractor 1.

In response to a first display button displayed on the display device 814 being operated, the controller 811 causes the display device 814 to display the travel route L1 in the agricultural field (for example, the travel route L1 illustrated in FIG. 10 for the agricultural field FA) on the composite map GMP illustrated in FIG. 16. In response to a second display button displayed on the display device 814 being operated, the controller 811 causes the display device 814 to display the road travel route L2 (for example, the road travel route L2 illustrated in FIG. 11A) on the composite map GMP illustrated in FIG. 16. The controller 811 of the transport vehicle 80 may be configured to combine road information received from the tractor 1 with road information stored in advance in the transport vehicle 80 to generate travel route (the travel route L1 and the road travel route L2).

Figure 17:
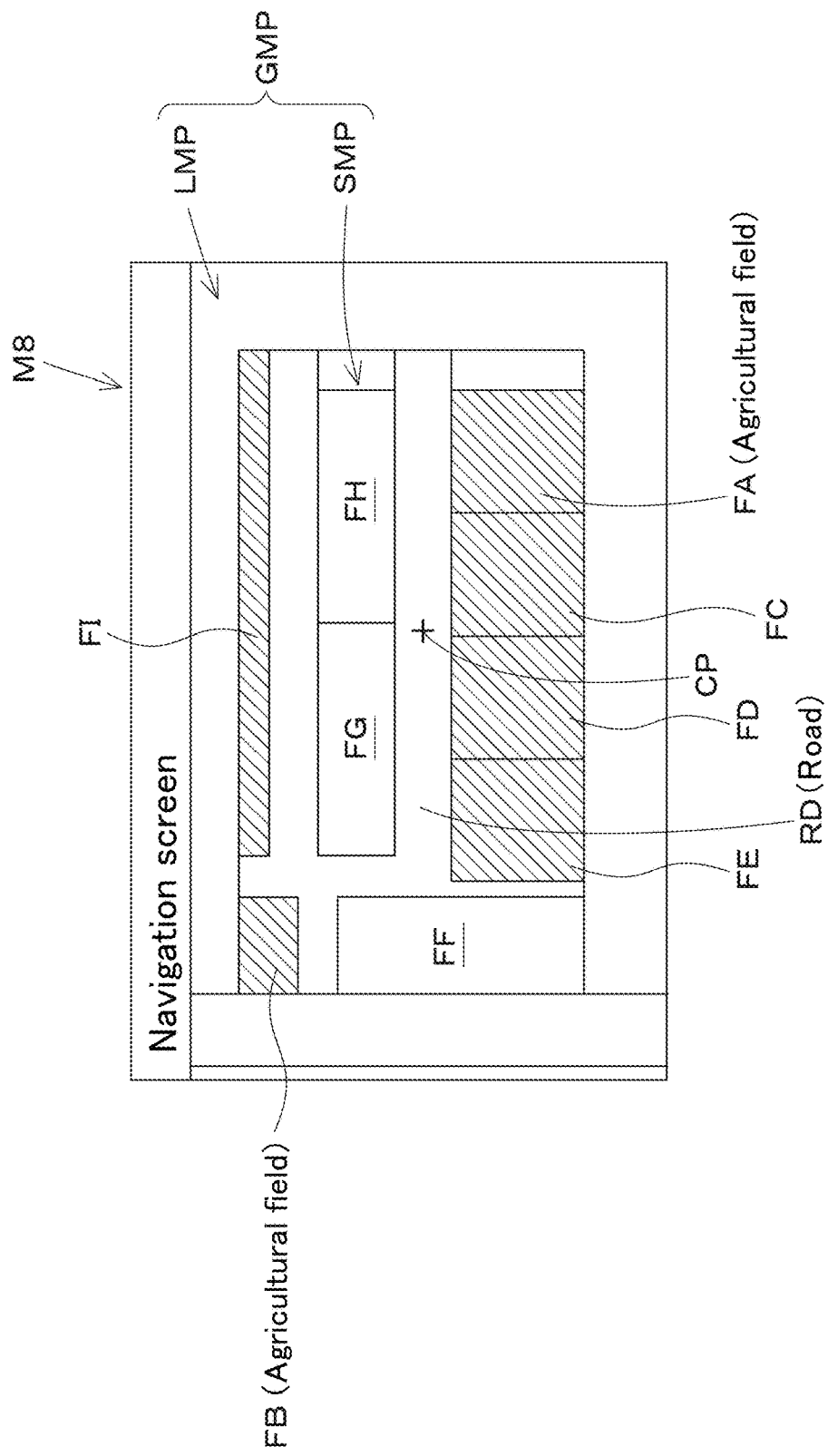
FIG. 17 is a diagram illustrating an example of trajectory information of the tractor displayed on the composite map on the navigation screen.

Further, it is assumed that the communication device 83 of the transport vehicle 80 receives information transmitted from the communication device 55 of the tractor 1 (for example, previous trajectory information of the tractor 1). The previous trajectory information of the tractor 1 is assumed to be trajectory information indicating that the tractor 1 has moved along the travel route L1 in the agricultural fields FA to FE and the agricultural field FI illustrated in FIG. 17. In response to a third display button displayed on the display device 814 being operated, the controller 811 of the transport vehicle 80 causes the display device 814 to display the previous trajectory information of the tractor 1. As illustrated in FIG. 17, the composite map GMP displayed on the display device 814 displays agricultural fields in which the tractor 1 has traveled along the travel route L1 (in FIG. 17, the agricultural fields FA to FE and the agricultural field FI in which the tractor 1 has traveled are hatched). The operator of the transport vehicle 80 can be informed that working has been completed for the agricultural fields FA to FE and the agricultural field FI and can also be informed of agricultural fields FF to FH for which working is incomplete. The operator is able to move the transport vehicle 80 to an agricultural field for which working is incomplete (for example, the agricultural fields FF to FH), lower the tractor 1 in such an agricultural field, and perform agricultural support.

In response to a fourth display button displayed on the display device 814 being operated, the controller 811 may cause the display device 814 to display current position information of the tractor 1 on the composite map GMP illustrated in FIG. 16, in place of current position information of the transport vehicle 80 or together with the current position information of the transport vehicle 80. The controller 811 of the transport vehicle 80 may be configured to display position information measured by the positioning device 40 of the tractor 1 (i.e., the current position of the tractor 1) in response to a trigger indicating that "the communication sensitivity or the accuracy of the position information of the positioning device 812 of the transport vehicle 80 is lower than a predetermined value", instead of in response to an operation of the fourth display button.

Further, the controller 811 may be configured to cause the display device 814 to display the map LMP (second map) illustrated in FIG. 13 and the aggregate map SMP (first map) illustrated in FIG. 11A together side by side horizontally or vertically in a displayable size, or may be configured to cause the display device 814 to display a map selected by the operator among the map LMP (second map) and the aggregate map SMP (first map). The controller 811 may create the composite map GMP when an instruction is given by the operator to make an update, and may not create the composite map GMP when an instruction is given by the operator not to make an update. In this case, the composite map GMP can be created and displayed in response to a confirmation made by the operator, and appropriate display can be performed as needed.

Alternatively, the controller 811 may execute matching between an image of the aggregate map SMP (first map) illustrated in FIG. 11A and an image of an area that matches the position of the aggregate map SMP on the map LMP illustrated in FIG. 13 (second map) to determine the degree of matching between the two images. If the degree of matching between the two images is less than a predetermined determination value (for example, 80%), the controller 811 may superimpose the aggregate map SMP on the map LMP to create the composite map GMP. If the degree of matching between the two images is greater than or equal to the determination value (for example, 80%), the controller 811 may not create the composite map GMP. Accordingly, when the two images are different in content, the composite map GMP can be generated and displayed on the display device 814. On the other hand, when the two images are identical or substantially identical in content, the composite map GMP is not created, and the map LMP can be displayed as is.

In S2 in FIG. 12, if the cross pointer CP indicating the current position of the transport vehicle 80 is not in the blank region BS (No in S2), for example, if the cross pointer CP is in a region having map information, such as a road, a building, an agricultural field, or a parking lot, the controller 811 proceeds to S2A. When an operation of selecting an instruction button (not illustrated) corresponding to "not receiving information from the tractor 1" is received or when an instruction operation corresponding to "receiving information from the tractor 1" is not received (No in S2A), the process ends.

In S7, the controller 811 determines whether a predetermined time (for example, 30 seconds) has elapsed from a time point at which the display of the message MG on the display device 814 was started in S3 in the case of Yes in S2 or from a time point at which the instruction button (not illustrated) corresponding to "receiving information from the tractor 1" was selected in the case of Yes in S2A (S7). If the predetermined time (for example, 30 seconds) has not elapsed (No in S7), the controller 811 returns to the processing of S4. On the other hand, if the predetermined time (for example, 30 seconds) has elapsed (Yes in S7), the controller 811 ends the process.

As described above, an agricultural support system includes a first communication device (the communication device 55) in or on the tractor 1 (agricultural machine) to transmit information, and a second communication device (the communication device 83) in or on the transport vehicle 80 to acquire the information transmitted from the communication device 55, the transport vehicle 80 being operable to transport the tractor 1. This configuration enables the transport vehicle 80 capable of transporting the tractor 1 (agricultural machine) to use the information from the agricultural machine for agricultural support. More specifically, the transport vehicle 80 capable of transporting the tractor 1 (agricultural machine) can use the information from the agricultural machine to aid in travel support. For example, the transport vehicle 80 can obtain information even on an area on which information required for traveling is insufficient. The transport vehicle 80 can travel on a road that is not shown on a map displayed by the car navigation device 81, such as a farm road in an agricultural field or a private road. In addition, the transport vehicle 80 can estimate the position thereof even in an area having no structure serving as a landmark to be used for self-position estimation. As a result, even a transport vehicle (carrier vehicle) configured to mainly travel on public roads and through urban areas can travel on farm roads and carry an agricultural machine.

The agricultural support system further includes a positioning device 40 in or on the tractor 1 (agricultural machine) to measure the position of the tractor 1. The first communication device (the communication device 55) transmits the position measured by the positioning device 40 to the second communication device (the communication device 83) as the information, and the communication device 83 receives the position transmitted from the communication device 55. This configuration enables the transport vehicle 80 operable to transport the tractor 1 (agricultural machine) to acquire the position of the tractor 1. Accordingly, the transport vehicle 80 capable of transporting the tractor 1 (agricultural machine) can receive support when traveling in an agricultural field.

The agricultural support system further includes the route creator 105 in or on the tractor 1 (agricultural machine) to create a travel route of the tractor 1. The first communication device (the communication device 55) transmits the travel route created by the route creator 105 to the second communication device (the communication device 83) as the information, and the communication device 83 receives the travel route transmitted from the communication device 55. This configuration enables the transport vehicle 80 capable of transporting the tractor 1 (agricultural machine) to acquire the travel route created by the route creator 105 of the tractor 1. Accordingly, the operator of the transport vehicle 80 operable to transport the tractor 1 (agricultural machine) can be informed of a travel route of the tractor 1 in an agricultural field, and can lower the tractor 1 at a position near the start point of the travel route in the agricultural field. As described above, the transport vehicle 80 operable to transport the tractor 1 (agricultural machine) can receive travel support using a travel route in an agricultural field.

The route creator 105 of the tractor 1 creates the travel route L1 and the road travel route L2. In other words, the route creator 105 creates the travel route that has not been set for the transport vehicle 80. This configuration enables the transport vehicle 80 operable to transport the tractor 1 (agricultural machine) to receive support when traveling in an agricultural field by using a travel route (i.e., the travel route L1 and the road travel route L2 of the tractor 1) that has not been set for the transport vehicle 80.

The agricultural support system further includes the map storage 102 (first storage) in or on the tractor 1 (agricultural machine) to store a first map (the aggregate map SMP). The communication device 55 transmits the first map (the aggregate map SMP) stored in the map storage 102 to the communication device 83 as the information, and the communication device 83 receives the first map (the aggregate map SMP) transmitted from the communication device 55. This configuration enables the transport vehicle 80 operable to transport the tractor 1 (agricultural machine) to receive support when traveling in an agricultural field by using the first map (the aggregate map SMP) transmitted from the tractor 1.

The agricultural support system further includes a second storage (the storage device 813) in or on the transport vehicle 80 to store a second map (the map LMP), and the display 814 in or on the transport vehicle 80 and capable of displaying the second map (the map LMP). The communication device 83 outputs the first map (the aggregate map SMP) transmitted from the communication device 55 to the display 814, and the display 814 displays the first map (the aggregate map SMP) on top of the second map (the map LMP). This configuration enables the transport vehicle 80 operable to transport the tractor 1 (agricultural machine) to receive support when traveling in an agricultural field by using the composite map GMP, which is obtained by displaying the first map (the aggregate map SMP) from the tractor 1 on top of the second map (the map LMP).

The map storage 102 (first storage) stores the first map (the road map MP3 in the aggregate map SMP), which includes road information not included in the second map (the map LMP). This configuration enables the transport vehicle 80 to receive support when traveling in an agricultural field by using the first map (the road map MP3 in the aggregate map SMP), which includes road information not included in the second map (the map LMP).

The agricultural support system further includes the switch 82 (instructor) to instruct the tractor 1 to transmit information from the communication device 55 (first communication device) to the second communication device (the communication device 83). This configuration enables the transport vehicle 80 to acquire the information from the tractor 1 at a timing when the operator gives an instruction to the switch 82.

The instructor include the switch 82 in or on the transport vehicle 80. This configuration enables the transport vehicle 80 to acquire the information from the tractor 1 at a timing when a worker (operator) on board the transport vehicle 80 performs a switch operation.

In the preferred embodiments described above, the operation of the switch 82 of the transport vehicle 80 is enabled only within a predetermined time (for example, 30 seconds) from the start of display of the message MG on the display device 814. However, the present invention is not limited thereto. The operation of the switch 82 may be always enabled. Preferably, the operation of the switch 82 is performed when the transport vehicle 80 is in stop mode. The transport vehicle 80 is caused to start traveling while the composite map GMP is displayed on the display 814 of the transport vehicle 80, and can thus be provided with appropriate travel guidance.

In the process illustrated in FIG. 12, S2 may be omitted. In this case, in S3, the controller 811 causes a message MG indicating "Please operate the switch if you want information on the tractor" to be displayed. If the switch 82 is operated (Yes in S4), the controller 811 transmits a request signal to the tractor 1 through the communication device 83 to request transmission of the information on the tractor 1. The request signal includes a transmission request signal and position information indicating the current position of the transport vehicle 80 instead of the position information of the blank region BS. Upon receiving the request signal from the transport vehicle 80, the communication device 55 of the tractor 1 transmits the information on the tractor 1 under the control of the controller 60 or the travel support device 100. Examples of the information on the tractor 1 include information such as the current position of the tractor 1, which is measured by the positioning device 40, a travel route including the current position of the transport vehicle 80 among the travel route L1 and the road travel route L2 stored in the route storage unit 106, and a map including the current position of the transport vehicle 80 in the aggregate map SMP (first map) stored in the map storage 102.

In response to the operator of the transport vehicle 80 designating any position on the navigation screen of the display device 814 (by touch operation) while the cross pointer CP indicating the current position of the transport vehicle 80 is not in the blank region BS having no map information, it may be determined whether the region OA including the designated position is the blank region BS (S2).

In the preferred embodiments described above, the controller 811 of the car navigation device 81 causes the display 814 to display the composite map GMP, which is obtained by superimposing the aggregate map SMP (first map) on the map LMP (second map). However, the present invention is not limited thereto. For example, the car navigation device 81 may receive the information from the tractor 1, that is, the map MP1 (the map MP1 on which the aggregate map SMP is arranged) displayed on the display 50 of the tractor 1, and display the received information as is. For example, in response to a fifth display button displayed on the display device 814 being operated, the controller 811 of the transport vehicle 80 causes the display device 814 to present the display of the display 50 of the tractor 1. That is, the tractor 1 is loaded on the transport vehicle 80, and the transport vehicle 80 may use the position information function (car navigation function) of the tractor 1 as is.

In the first preferred embodiment described above, the position detected by the positioning device 812 of the car navigation device 81 is displayed on the display 814. However, the position detected by the positioning device 40 of the tractor 1 may be displayed on the display 814 as the current position of the transport vehicle 80. In this case, the position detected by the positioning device 40 is transmitted to the communication device 83 of the transport vehicle 80 from the communication device 55 of the tractor 1.

Second Preferred Embodiment

Figure 18:
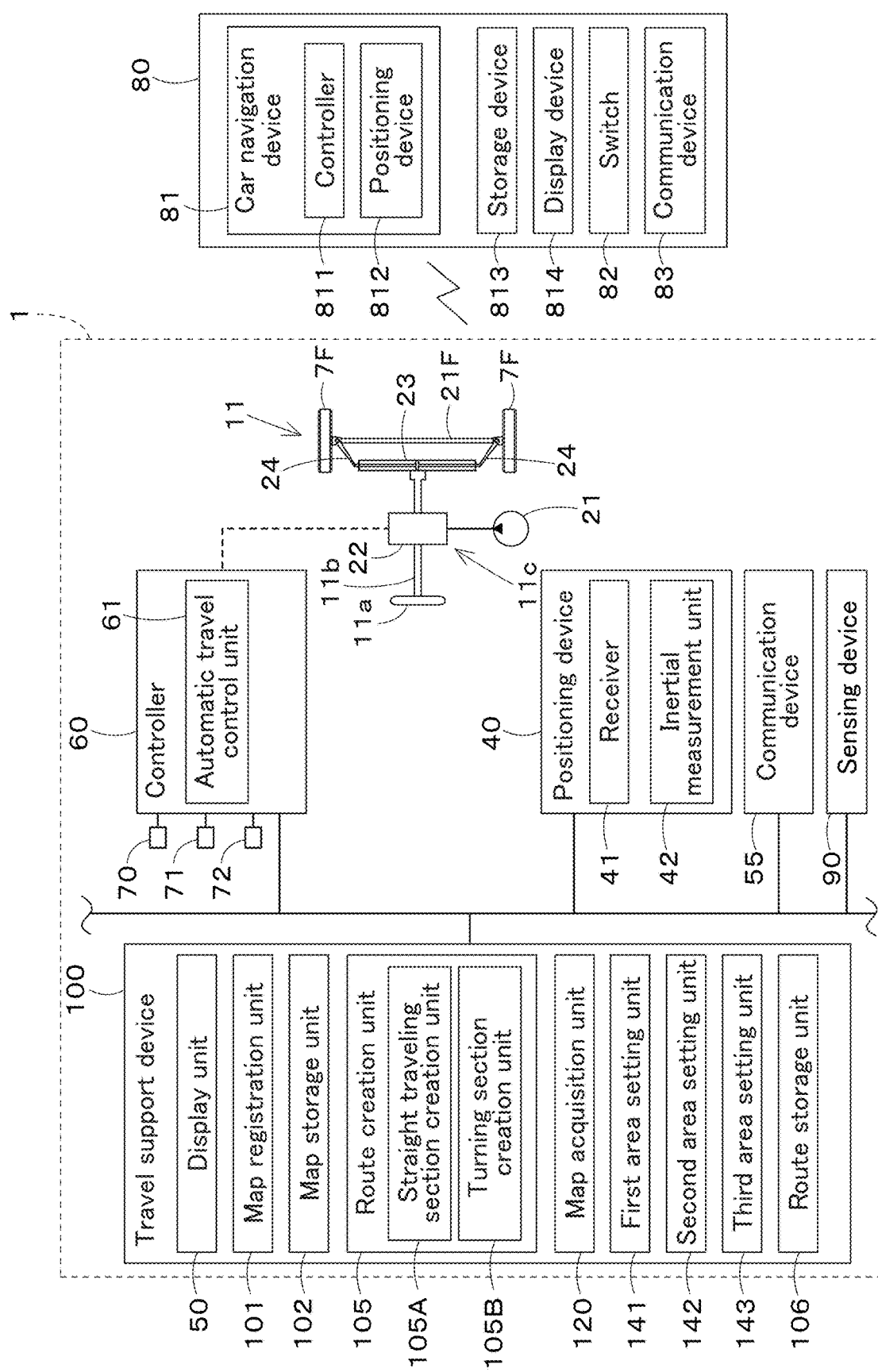
FIG. 18 is a block diagram of an agricultural support system according to a second preferred embodiment of the present invention.

FIG. 18 is a block diagram of an agricultural support system according to a second preferred embodiment. In the second preferred embodiment, a description of a configuration similar to that of the first preferred embodiment will be omitted.

As illustrated in FIG. 18, the tractor 1 includes a sensing device 90. The sensing device 90 is an optical sensor, a sonic sensor, or the like. When the sensing device 90 is an optical sensor, the sensing device 90 is an imaging device such as a camera, a light detection and ranging (LiDAR) device, or the like. The imaging device is a charge-coupled device (CCD) camera equipped with a CCD image sensor or a complementary metal oxide semiconductor (CMOS) camera equipped with a CMOS image sensor. The LiDAR device (laser sensor) emits pulsed infrared light or the like millions of times per second, and measures a reflection time to detect a distance to an object that has reflected the infrared light. When the sensing device 90 is a sonic sensor, the sensing device 90 is a sonar. The sonar emits sound waves and detects a distance to an object that has reflected the sound waves. In the second preferred embodiment, the sensing device 90 may be any one of an imaging device, a LiDAR device (laser sensor), and a sonar, and any combination of an imaging device, a LiDAR device (laser sensor), and a sonar may be mounted on the tractor 1, as a non-limiting example.

The sensing device 90 is attached to the tractor 1 so as to sense the surroundings of the tractor 1 (the traveling vehicle 3) in front of, behind, and/or to the side of the tractor 1 (the traveling vehicle 3). The sensing direction of the sensing device 90 is not limited.

Figure 19A:
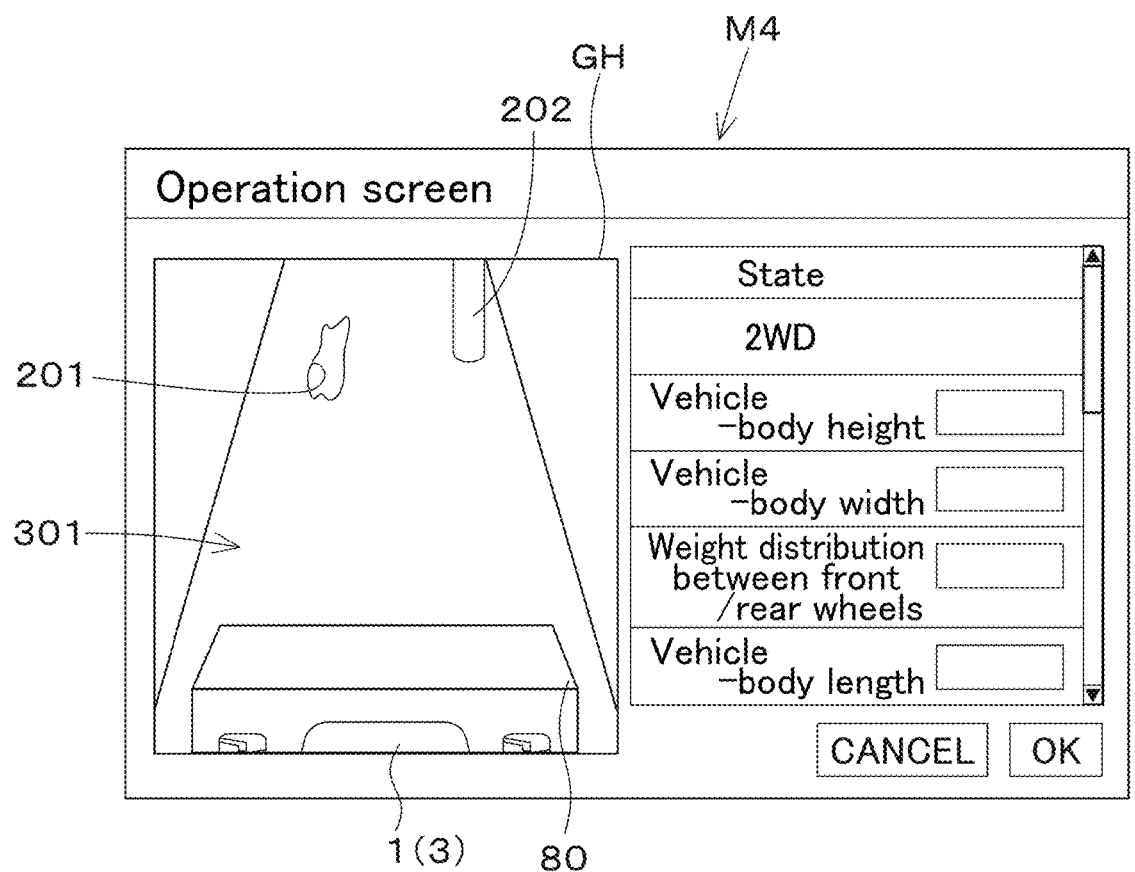
FIG. 19A is a diagram illustrating an example of a display screen on a display device of a transport vehicle on which a tractor is loaded.
Figure 19B:
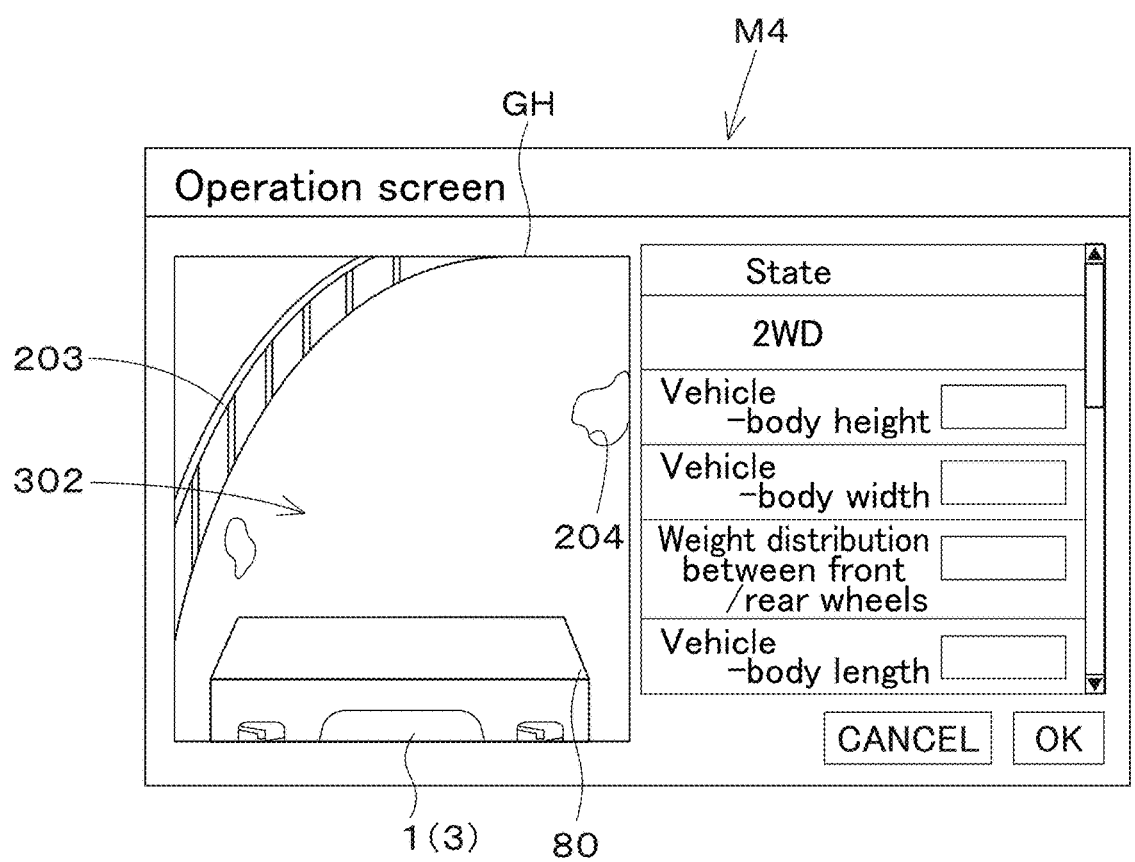
FIG. 19B is a diagram illustrating an example of a display screen on the display device of the transport vehicle on which the tractor is loaded.

When the tractor 1 moves together with the transport vehicle 80 while the tractor 1 is loaded on the transport vehicle 80, detection information detected by the sensing device 90 of the tractor 1 is transmitted to the communication device 83 through the communication device 55. As illustrated in FIG. 11B, in the tractor 1 loaded on the transport vehicle 80, the sensing device 90 is capable of detecting the state of the surroundings of the transport vehicle 80 and capable of transmitting the state of the surroundings (detection information) to the transport vehicle 80. For example, in the tractor 1 loaded on the transport vehicle 80, as illustrated in FIG. 19A and FIG. 19B, the sensing device 90 transmits, as the state of the surroundings (detection information), a captured image GH (for example, an image of the scene ahead of the transport vehicle 80), which is captured by the imaging device, to the communication device 83 through the communication device 55. The captured image GH showing the scene ahead of the transport vehicle 80, which has been transmitted to the communication device 83, is presented on a display screen M4 displayed on the display device 814.

The captured image GH illustrated in FIG. 19A is a captured image of the scene ahead of the transport vehicle 80, which is captured by the sensing device 90 of the tractor 1 loaded on the transport vehicle 80. For example, the captured image GH includes a road 301, irregularities 201 of the road 301, and a structure 202 (for example, a utility pole) installed on the road 301, and a roof portion of the transport vehicle 80 appears on the captured image GH. The captured image GH illustrated in FIG. 19B includes, for example, a road 302, a structure 203 (for example, a guardrail) on the road 302, and irregularities 204 of the road 302, and a roof portion of the transport vehicle 80 appears on the captured image GH. The state of the surroundings includes a road state. The road state includes the irregularities 201 or 204 of the road 301 or 302, information on whether the road 301 or 302 is paved, the width and height of the structure 202 or 203 installed on the road 301 or 302, and the width of the road 301 or 302, for example. Examples of the structures 202 and 203 include utility poles, signals, road signs, side ditches, signboards, gates, streets, pedestrian bridges, bridge piers, poles, guardrails, fences, and sidewalks.

Figure 19C:
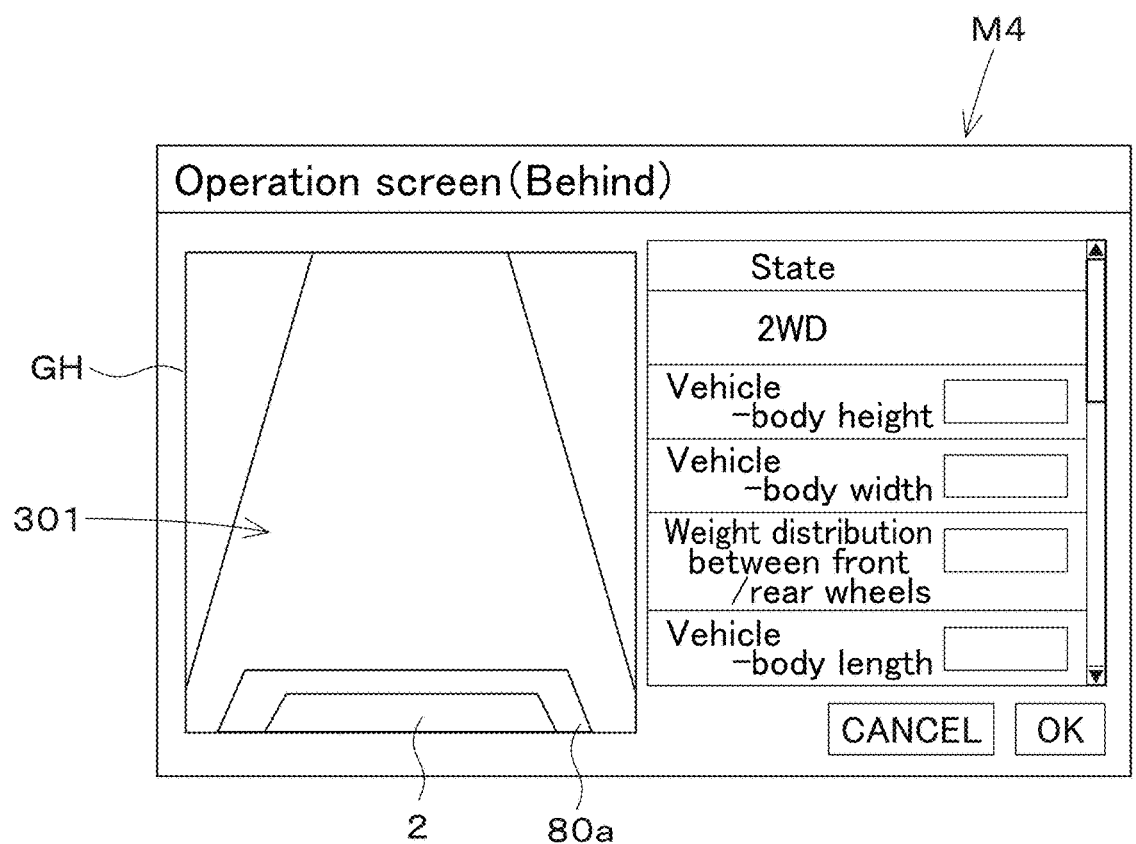
FIG. 19C is a diagram illustrating an example of a display screen on the display device of the transport vehicle on which the tractor is loaded.

In the tractor 1 loaded on the transport vehicle 80, detection information detected by the sensing device 90 (for example, a captured image GH of the scene behind the transport vehicle 80 illustrated in FIG. 19C) may be transmitted to the communication device 83 through the communication device 55 and displayed on the display screen M4 of the display device 814. For example, as illustrated in FIG. 19E and FIG. 19F, a predetermined range A1 detected by the sensing device 90 includes a portion of the platform 80a (a portion of the platform 80a behind a rear portion of the tractor 1) and an area behind the platform 80a. That is, the sensing device 90 detects at least a range behind a rear end of the platform 80a, the range being behind the platform 80a in the horizontal direction and ranging from a lower end of the platform 80a to the ground in the vertical direction, and detection information, such as the captured image GH of the scene behind the transport vehicle 80 illustrated in FIG. 19C, is displayed on the display device 814. As a result, the area behind the platform 80a of the transport vehicle 80 is detectable by the sensing device 90 attached to the tractor 1 (object being transported) loaded on the platform 80a.

Figure 19D:
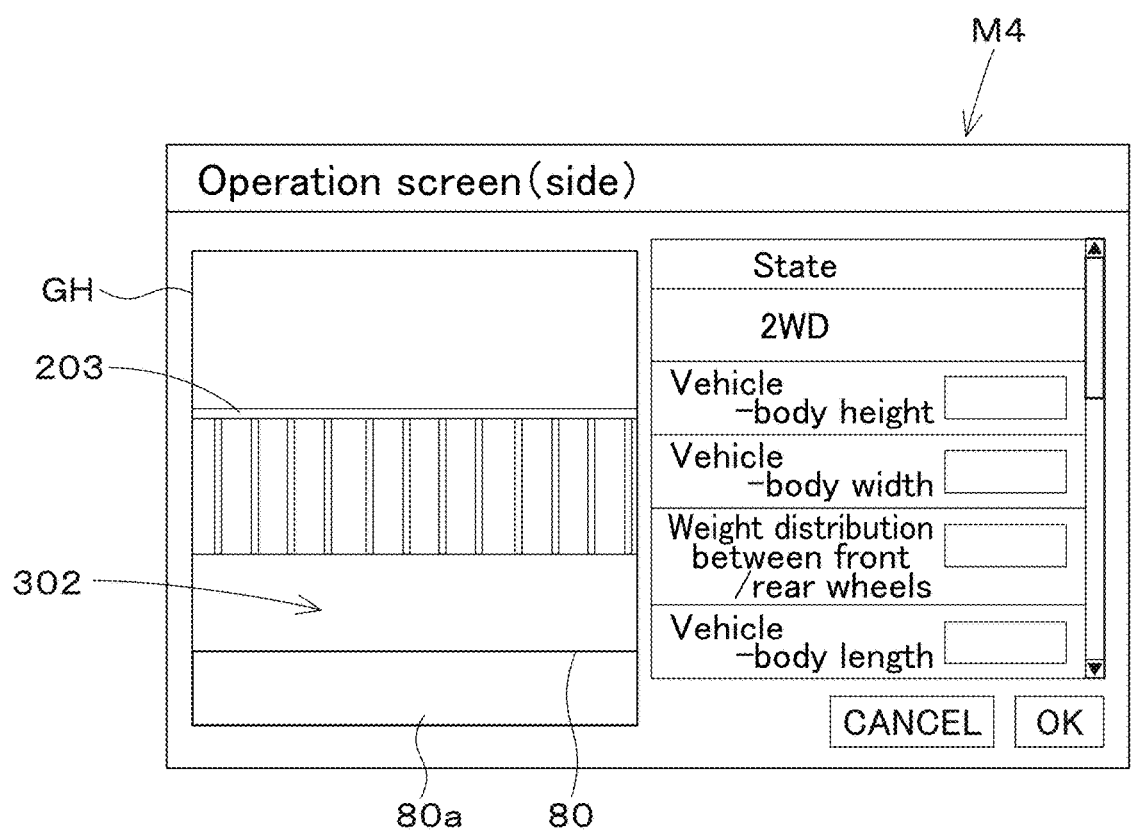
FIG. 19D is a diagram illustrating an example of a display screen on the display device of the transport vehicle on which the tractor is loaded.
Figure 19E:
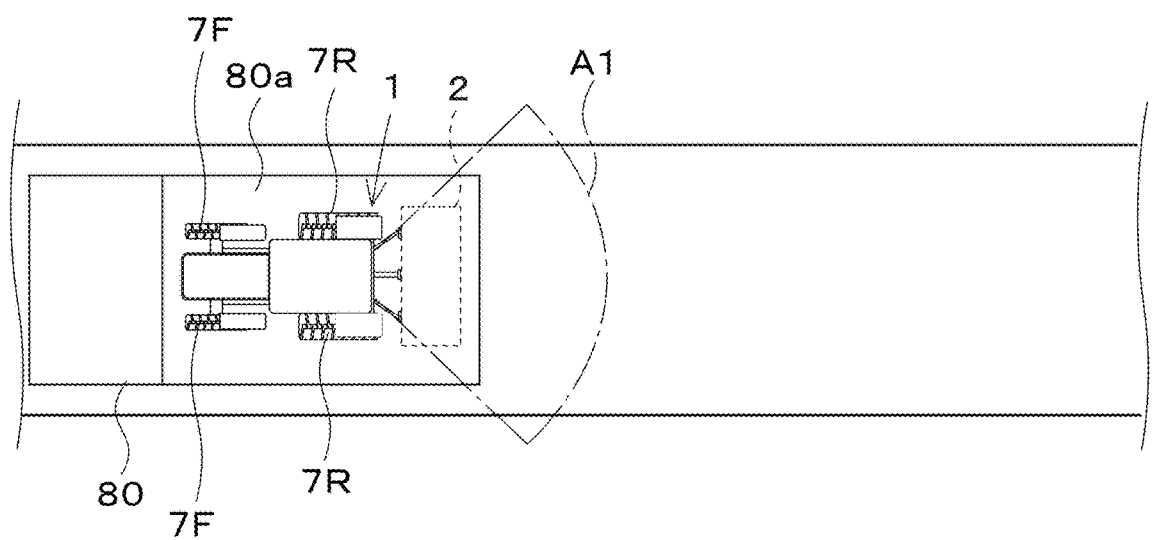
FIG. 19E is a plan view of the transport vehicle loaded with the tractor when the tractor detects the surroundings behind the tractor.
Figure 19F:
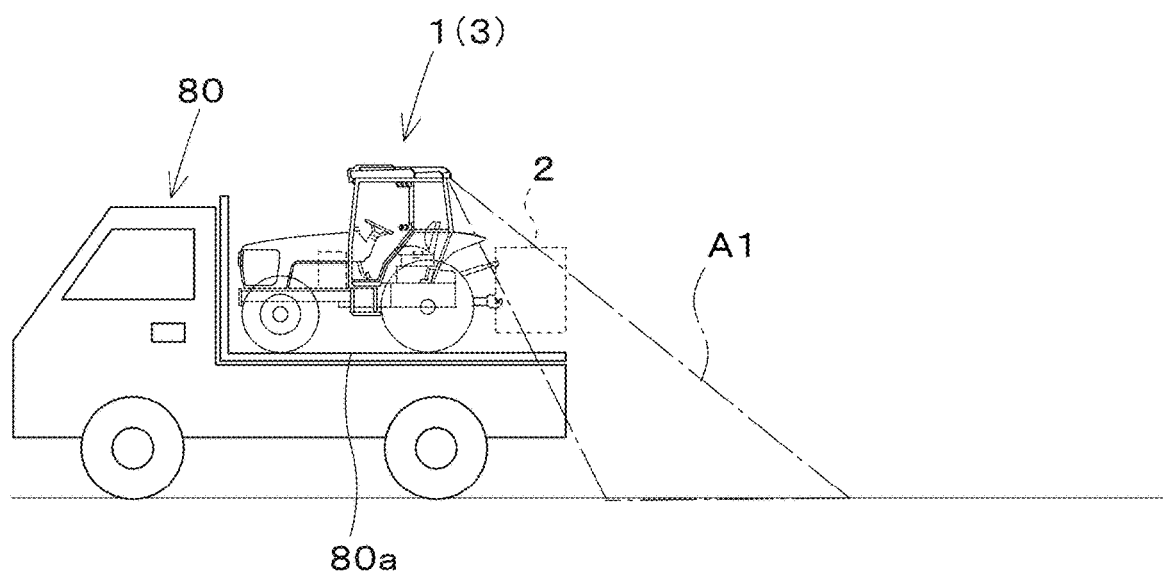
FIG. 19F is a side view of the transport vehicle loaded with the tractor when the tractor detects the surroundings behind the tractor.
Figure 19G:
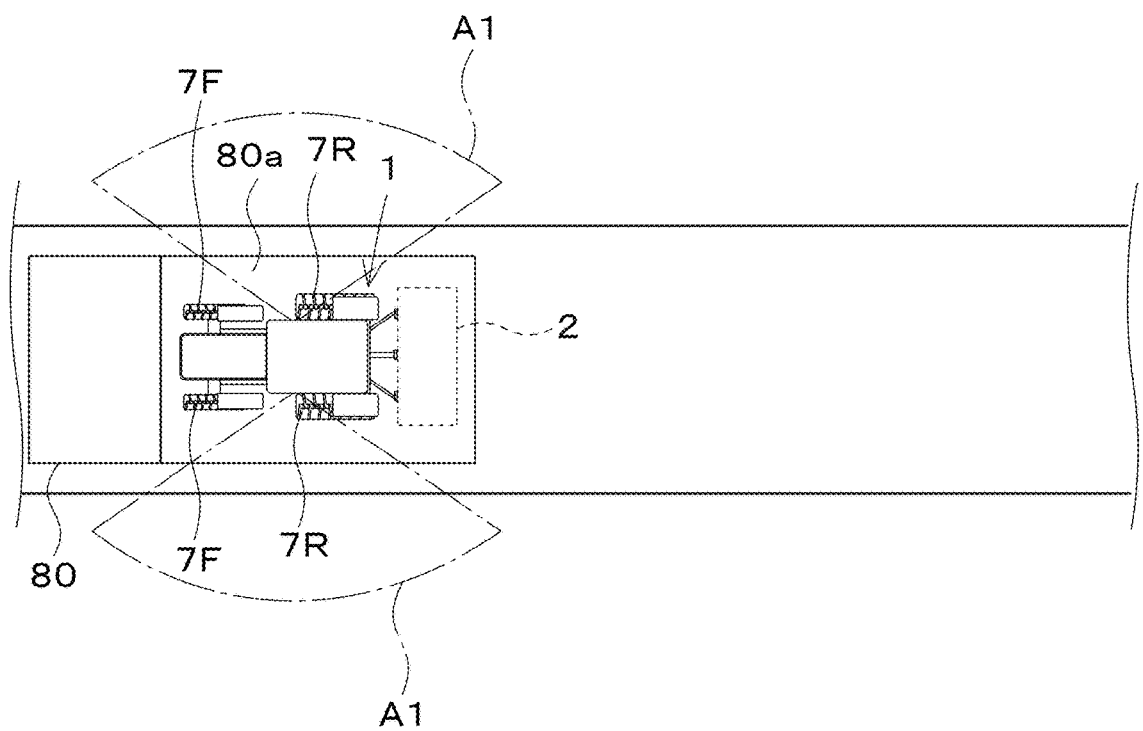
FIG. 19G is a plan view of the transport vehicle loaded with the tractor when the tractor detects the surroundings to the side of the tractor.
Figure 19H:
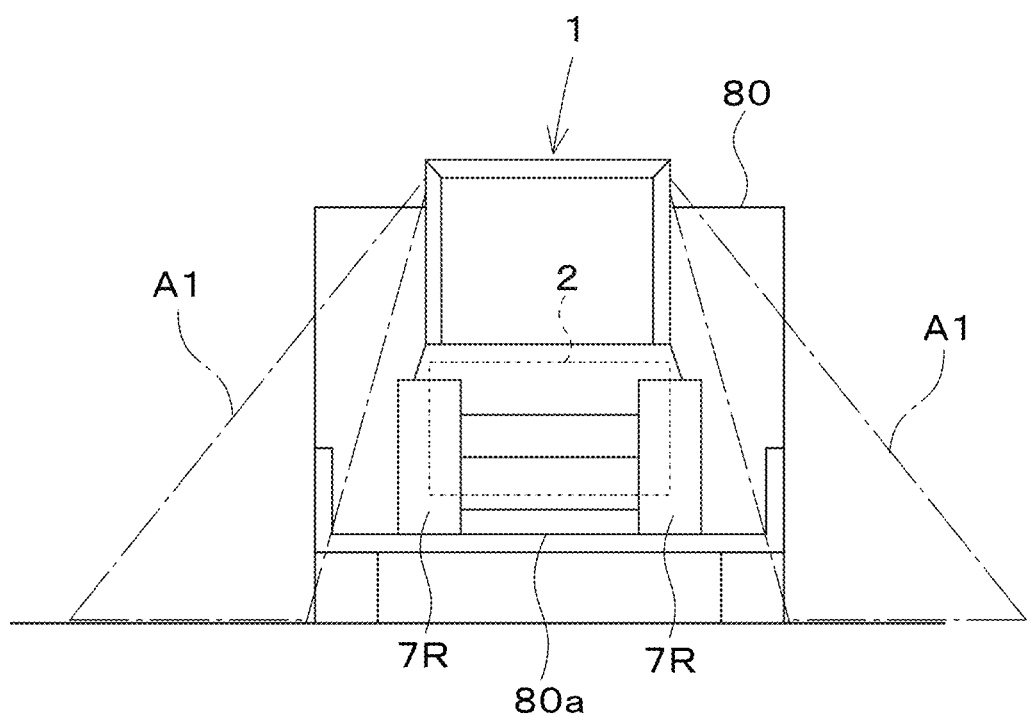
FIG. 19H is a rear view of the transport vehicle loaded with the tractor when the tractor detects the surroundings to the side of the tractor.

Alternatively, in the tractor 1 loaded on the transport vehicle 80, detection information detected by the sensing device 90 (for example, a captured image GH of the scene to the side of the transport vehicle 80 illustrated in FIG. 19D) may be transmitted to the communication device 83 through the communication device 55 and displayed on the display screen M4 of the display device 814. For example, as illustrated in FIG. 19G and FIG. 19H, at least one predetermined range A1 detected by the sensing device 90 includes a portion of the platform 80a (a portion of the platform 80a to the left or right of the tractor 1) and an area to the left or right of the platform 80a. That is, the sensing device 90 detects at least a range to the left of the platform 80a in the horizontal direction, ranging from the left side of the platform 80a to the ground in the vertical direction, or a range to the right of the platform 80a in the horizontal direction, ranging from the right side of the platform 80a to the ground in the vertical direction, and detection information, such as the captured image GH of the scene to the side of the transport vehicle 80 (to the left or to the right) illustrated in FIG. 19D, is displayed on the display device 814. As a result, an area to the side of the platform 80a of the transport vehicle 80 is detectable by the sensing device 90 attached to the tractor 1 (movable object being transported) loaded on the platform 80a. In other words, an area to the side of the transport vehicle 80 is detectable by the sensing device 90 attached to the tractor 1 (movable object being transported) from inclination information of the platform 80a.

As described above, the sensing device 90 mounted on a movable object being transported, such as a vehicle (for example, the tractor 1) to be transported by the transport vehicle 80, can detect the surroundings of the transport vehicle 80 and notify the transport vehicle 80 of the state of the surroundings.

The captured image GH may include at least two or more of an image of the scene ahead of the transport vehicle 80, an image of the scene behind the transport vehicle 80, and an image of the scene to the side of the transport vehicle 80.

The display device 814 (see FIG. 18), which is disposed around the operator's seat of the transport vehicle 80, displays the display screen M4 including the captured image GH. With this configuration, even if the transport vehicle 80 includes no sensing device, an image of the surroundings of the transport vehicle 80 during traveling can be acquired by the imaging device of the tractor 1. In the second preferred embodiment, a description has been given taking the captured image GH as an example. As an alternative to this, detection information detected by a LiDAR device (laser sensor) disposed in the tractor 1, detection information detected by a sonar disposed in the tractor 1, or the like may be transmitted to the transport vehicle 80 and displayed on the display device 814 of the transport vehicle 80.

As described above, the agricultural support system according to the second preferred embodiment includes the sensing device 90 disposed in the agricultural machine. The communication device 55 transmits, as the information, detection information detected by the sensing device 90 to the communication device 83, and the communication device 83 receives the detection information transmitted from the communication device 55. This configuration enables the operator of the transport vehicle 80 to easily grasp the state of the surroundings of the transport vehicle 80 from information from the tractor 1 while, for example, transporting the tractor 1.

The agricultural support system further includes the display device 814 disposed in the transport vehicle 80 and configured to display the detection information detected by the sensing device 90. This configuration enables the operator of the transport vehicle 80 to operate the transport vehicle 80 while grasping the state of the surroundings of the transport vehicle 80.

In the preferred embodiments described above, agricultural machines as examples of a working machine is the tractor 1 (working vehicle), but are not limited to the working vehicle. Examples of the agricultural machine may include a tractor to which a working device is coupled, a rice transplanter including a working device, and a combine.

In addition, the working machine is not limited to an agricultural machine. Examples of the working machine may include a utility vehicle (UV) and a riding mower (mower). Other examples of the working machine may include construction machines such as a turning working machine (backhoe), a wheel loader, a skid-steer loader, and a compact track loader. Still other examples of the working machine may include a grass mower, a tedder, a rake, and a baler. Accordingly, the technique disclosed herein is also applicable to cases where information from a working machine such as a utility vehicle, a riding mower, or a construction machine is used by a transport vehicle.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An agricultural support system, comprising:
    a first communication device in or on an agricultural machine operable to travel in an agricultural field, the first communication device including a first communication module to transmit information and perform wireless communication; and
    a second communication device in or on a transport vehicle operable to transport the agricultural machine, the second communication device including a second communication module to acquire the information transmitted from the first communication device and to perform wireless communication; and
    a route creator in or on the agricultural machine to create a travel route of the agricultural machine, the travel route being at least a travel route in the agricultural field; wherein
    the first communication device is operable to transmit the travel route created by the route creator to the second communication device as the information when the agricultural machine is loaded on the transport vehicle;
    the second communication device is operable to receive the travel route transmitted from the first communication device;
    the transport vehicle includes a navigation device to provide a route guidance from a current position to a destination when the transport vehicle travels;
    the navigation device includes a display to display a map including the current position of the transport vehicle and the current position of the transport vehicle on the map; and
    the display is operable, when the map includes a blank region, to display on a position of the blank region a travel route to be superimposed on the blank region based on the travel route transmitted from the first communication device and received by the second communication device.

2. The agricultural support system according to claim 1, further comprising:
    a position sensor in or on the agricultural machine to detect a position of the agricultural machine; wherein
    the first communication device is operable to transmit the position detected by the position sensor to the second communication device as the information; and
    the second communication device is operable to receive the position transmitted from the first communication device.

3. The agricultural support system according to claim 1, wherein the route creator is operable to create the travel route that has not been set for the transport vehicle.

4. The agricultural support system according to claim 1, further comprising:
    a first storage in or on the agricultural machine to store a first map; wherein
    the first communication device is operable to transmit the first map stored in the first storage to the second communication device as the information; and
    the second communication device is operable to receive the first map transmitted from the first communication device.

5. The agricultural support system according to claim 4, further comprising:
    a second storage in or on the transport vehicle to store a second map; and
    a display in or on the transport vehicle to display the second map; wherein
    the second communication device is operable to output the first map transmitted from the first communication device to the display; and
    the display is operable to display the first map on top of the second map.

6. The agricultural support system according to claim 5, wherein the first storage is operable to store the first map, the first map including road information not included in the second map.

7. The agricultural support system according to claim 1, further comprising:
an instructor to instruct the agricultural machine to transmit the information from the first communication device to the second communication device.

8. The agricultural support system according to claim 7, wherein the instructor includes a switch in or on the transport vehicle.

* * * * *